US012621744B2

(12) United States Patent
Perras et al.

(10) Patent No.: US 12,621,744 B2
(45) Date of Patent: May 5, 2026

(54) CHANGE OF PC5 LINK IDENTIFIERS BETWEEN THE WTRU AND THE LAYER-2 WTRU TO WTRU RELAY

(71) Applicant: InterDigital Patent Holdings, Inc., Wilmington, DE (US)

(72) Inventors: Michelle Perras, Montreal (CA); Samir Ferdi, Kirkland (CA); Xiaoyan Shi, Lake Oswego, OR (US); Taimoor Abbas, Sainte-Julie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 248 days.

(21) Appl. No.: 18/271,374

(22) PCT Filed: Jan. 7, 2022

(86) PCT No.: PCT/US2022/011541
§ 371 (c)(1),
(2) Date: Jul. 7, 2023

(87) PCT Pub. No.: WO2022/150542
PCT Pub. Date: Jul. 14, 2022

(65) Prior Publication Data
US 2024/0357467 A1     Oct. 24, 2024

Related U.S. Application Data

(60) Provisional application No. 63/170,888, filed on Apr. 5, 2021, provisional application No. 63/134,838, filed on Jan. 7, 2021.

(51) Int. Cl.
*H04W 40/22*     (2009.01)
*H04B 7/155*     (2006.01)
(Continued)

(52) U.S. Cl.
CPC ........... *H04W 40/22* (2013.01); *H04W 12/04* (2013.01); *H04B 7/15528* (2013.01); *H04B 7/2606* (2013.01)

(58) Field of Classification Search
CPC ..... H04W 40/22; H04W 12/04; H04W 12/03; H04W 84/047; H04W 88/04; H04B 7/15528; H04B 7/2606
See application file for complete search history.

(56) References Cited

U.S. PATENT DOCUMENTS

| | | | |
|---|---|---|---|
| 2005/0232426 A1 | 10/2005 | Konersmann et al. | |
| 2020/0077253 A1 | 3/2020 | Kim et al. | |
| 2020/0272446 A1* | 8/2020 | Koo | G06F 8/61 |

FOREIGN PATENT DOCUMENTS

WO     2020/198216 A1     10/2020

OTHER PUBLICATIONS

3rd Generation Partnership Project (3GPP), TR 23.752 V1.0.0, "Technical Specification Group Services and System Aspects, Study on system enhancement for Proximity based Services (ProSe) in the 5G System (5GS) (Release 17)", Nov. 2020, pp. 1-181.
(Continued)

*Primary Examiner* — Diane D Mizrahi
(74) *Attorney, Agent, or Firm* — Condo Roccia Koptiw LLP

(57) ABSTRACT

In examples, the E2E link IDs may be isolated per-hop, so that changes of link IDs may not impact other E2E/per-hop links (e.g., a LIU procedure may only run between a WTRU and the relay). A relay may allocate R-specific security IDs/session key identifiers (e.g., MSBs/LSBs of Knrp-sess ID). The relay (e.g., relay WTRU) may replace the security IDs/session key identifiers received from peer WTRUs with R-specific security IDs/session key identifiers, for example, if forwarding a message. In examples, per-hop IDs and E2E IDs may be added to link identifier update messages. In
(Continued)

examples, the support application layer ID and IP address/prefix may be changed using a link modification procedure (e.g., between E2E peer WTRUs), which may be executed during the LIU procedure run between a WTRU and a WTRU-to-WTRU relay.

20 Claims, 11 Drawing Sheets

(51) Int. Cl.
     *H04B 7/26*          (2006.01)
     *H04W 12/04*         (2021.01)

(56)                 References Cited

OTHER PUBLICATIONS

European Telecommunications Standards Institute (ETSI), TS 124 587 V16.2.1, "5G; Vehicle-to Everything (V2X) services in 5G System (5GS), Stage 3", (3GPP TS 24.587 version 16.2.1 Release 16), Oct. 2020, 107 pages.
European Telecommunications Standards Institute (ETSI), TS 124 587 V17.6.0, "5G, Vehicle-to Everything (V2X) services in 5G System (5GS), Stage 3, (3GPP TS 24.587 version 17.6.0 Release 17)", Aug. 2022, 119 pages.

* cited by examiner

CHANGE OF PC5 LINK IDENTIFIERS BETWEEN THE WTRU AND THE LAYER-2 WTRU TO WTRU RELAY

CROSS-REFERENCE TO RELATED APPLICATIONS

This application is the National Stage Entry under 35 U.S.C. § 371 of Patent Cooperation Treaty Application No. PCT/US2022/011541, filed Jan. 7, 2022, which claims the benefit of Provisional U.S. Patent Application No. 63/134,838, filed Jan. 7, 2021, and Provisional U.S. Patent Application No. 63/170,888, filed Apr. 5, 2021, the disclosures of which are incorporated herein by reference in their entireties.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

In examples, the end-to-end (E2E) link identifications (IDs) may be isolated per-hop, so that changes of link IDs may not impact other E2E/per-hop links (e.g., a Linked Identifier Update (LIU) procedure may run between a WTRU and the relay). A relay (e.g., a relay WTRU) may allocate R-specific security IDs/session key identifiers (e.g., most significant bits (MSBs)/least significant bits (LSBs) of Knrp-sess ID). The relay (e.g., relay WTRU) may replace the security IDs/session key identifiers received from peer WTRUs with R-specific security IDs/session key identifiers, for example, if forwarding a message. In examples, per-hop IDs and E2E IDs may be added to link identifier update messages. In examples, the support application layer ID and IP address/prefix may be changed using a link modification procedure (e.g., between E2E peer WTRUs), which may be executed during the LIU procedure run between a WTRU and a WTRU-to-WTRU relay.

In examples, a WTRU may send a Direct Communication Request (DCR) message. The DCR message may not include an adaptation header. The DCR message may be sent for a discovery and link establishment request (e.g., integrated discovery). A relay (e.g., relay WTRU) may receive the DCR message. The relay (e.g., relay WTRU) may add an adaptation header to the DCR message before forwarding it.

In examples, for standalone discovery, announcement and solicitation messages may be sent without an adaptation header. A relay (e.g., relay WTRU) may add an adaptation header before forwarding the messages. The response message may be sent with the adaptation header from the responding WTRU. In examples, no adaptation header may be used, and the E2E ID may be added to the message payload.

In examples, a relay (e.g., a relay WTRU) for establishing an E2E link may be provided. The relay WTRU may include a processor The processor may be configured to receive a first message from a first WTRU. The first message may indicate MSBs for the first WTRU that may be associated with a session key identifier. The processor may be configured to send a second message to a second WTRU. The second message may indicate relay MSBs. The relay MSBs may be associated with the MSBs for the first WTRU and may be associated with the session key identifier. The processor may be configured to send a third message to the first WTRU. The third message may indicate relay LSBs. The relay LSBs may be associated with LSBs for the second WTRU and may be associated with the session key identifier.

DETAILED DESCRIPTION

Figure 1A:
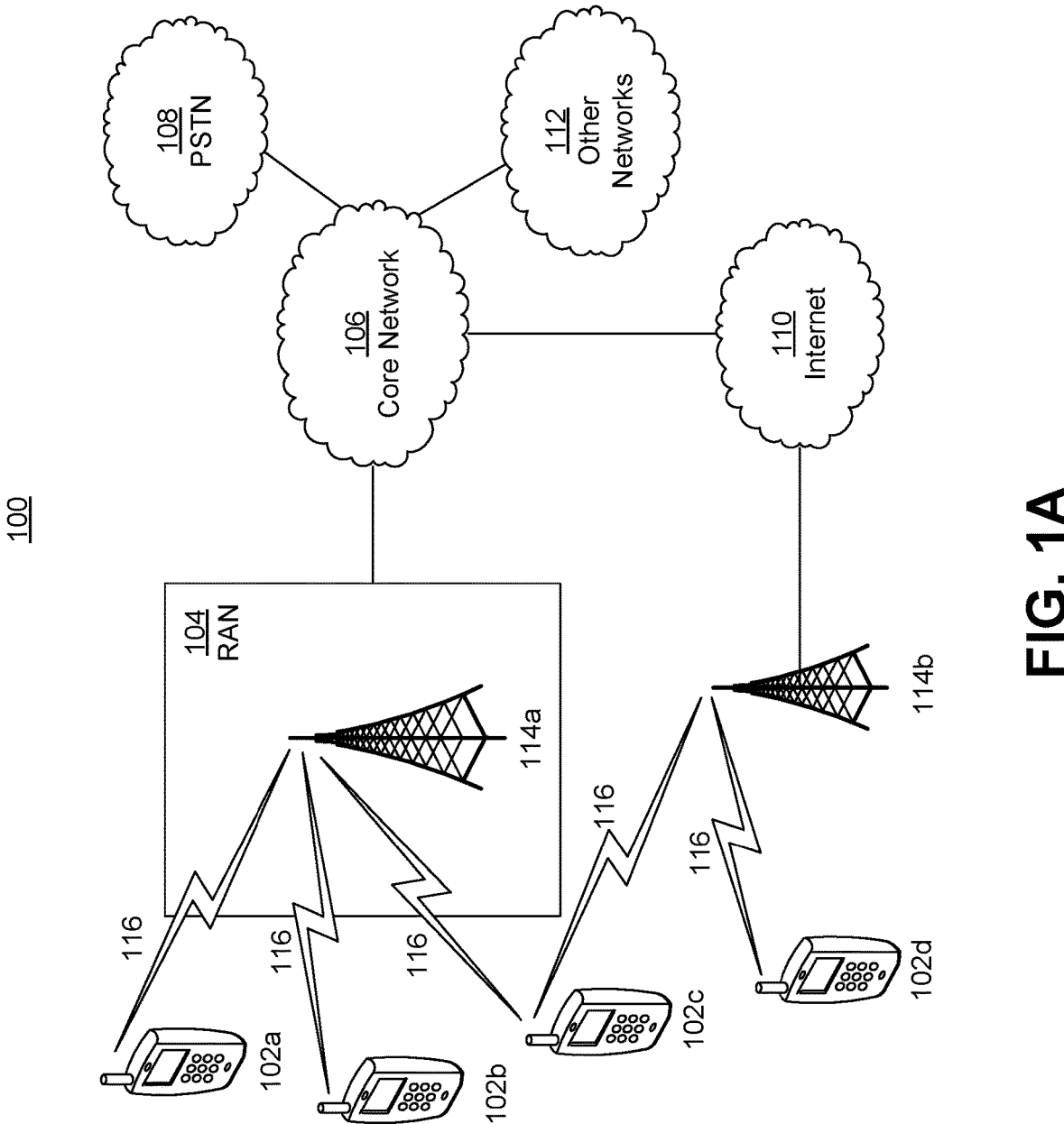
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 1041113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
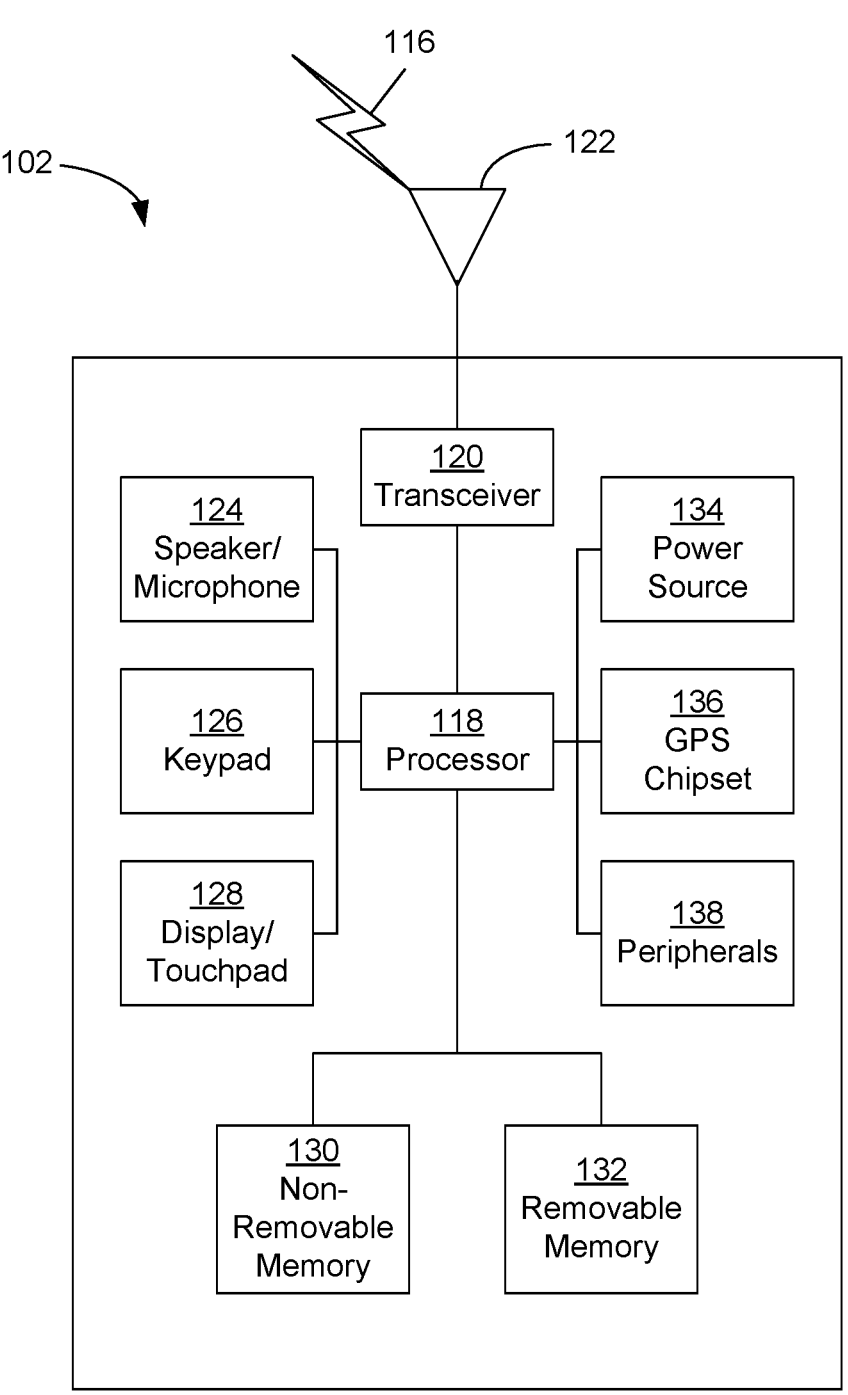
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
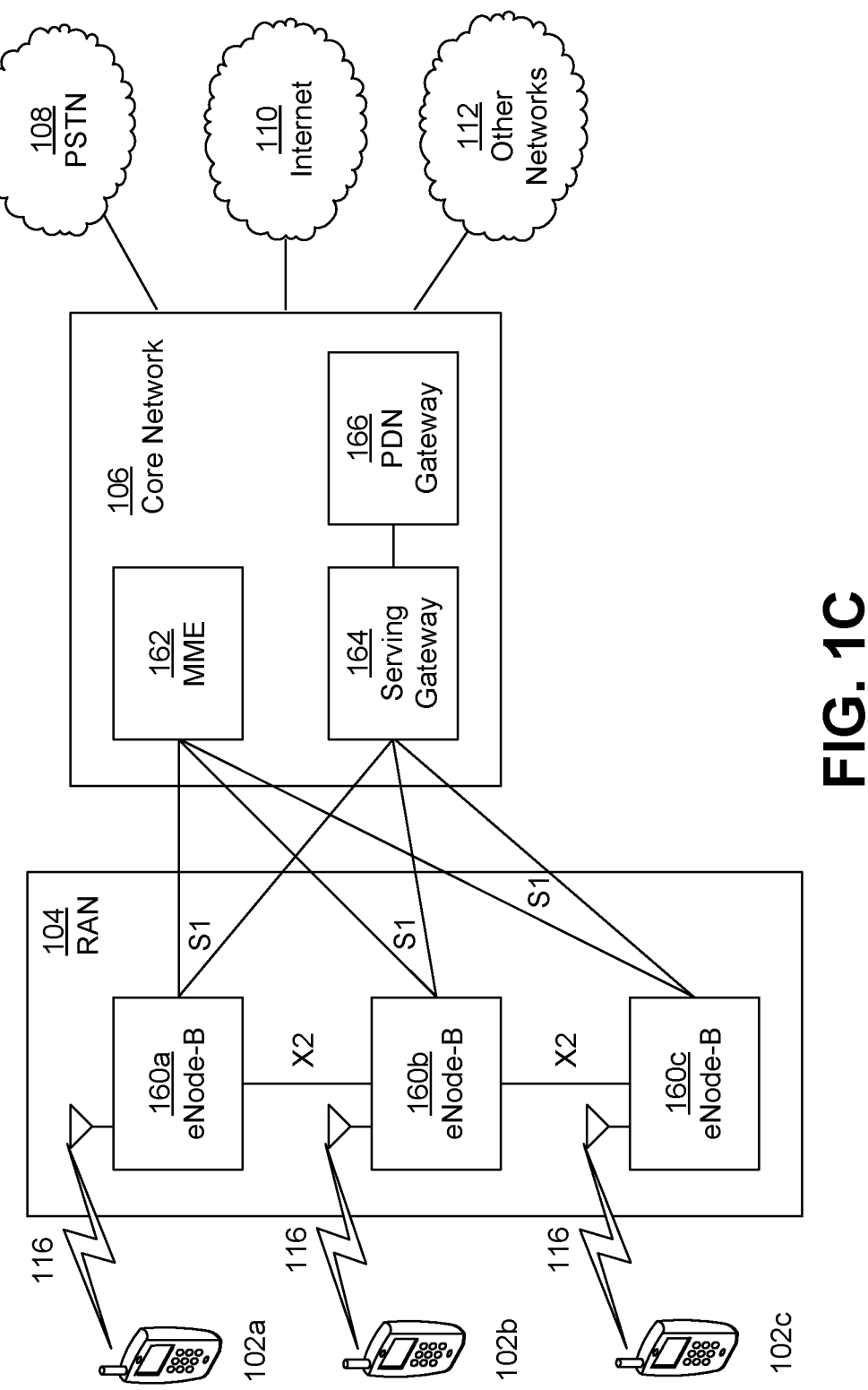
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
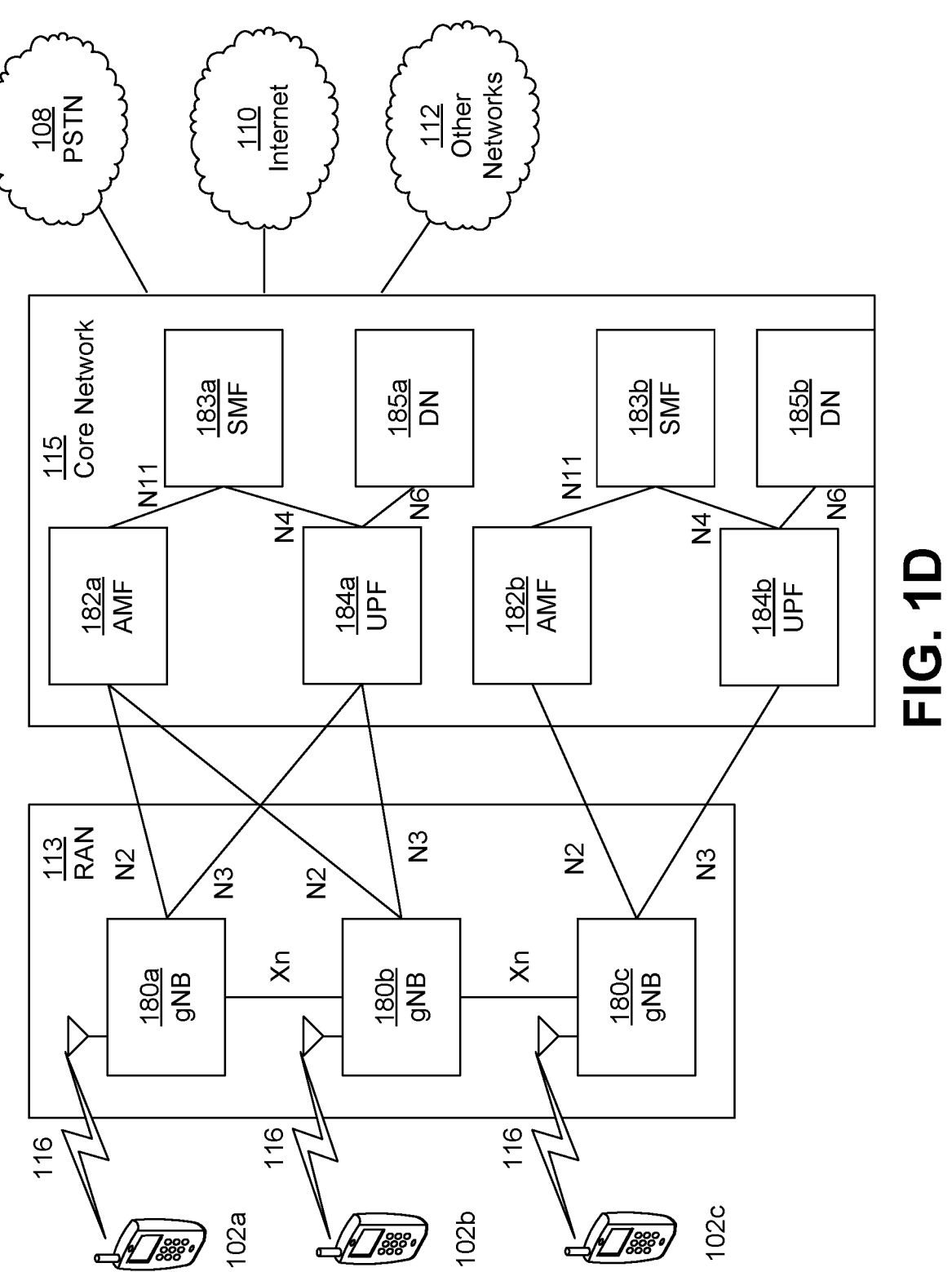
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*. 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment Direct RF coupling and/or wireless communications via RF circuitry (e.g., which may include one or more antennas) may be used by the emulation devices to transmit and/or receive data.

In examples, a relay (e.g., a relay WTRU) for establishing an end-to-end (E2E) link may be provided. The relay WTRU may include a processor. The processor may be configured to receive a first message from a first WTRU. The first message may indicate most significant bits (MSBs) for the first WTRU that may be associated with a session key identifier. The processor may be configured to send a second message to a second WTRU. The second message may indicate relay MSBs. The relay MSBs may be associated with the MSBs for the first WTRU and may be associated with the session key identifier. The processor may be configured to send a third message to the first WTRU. The third message may indicate relay least significant bits (LSBs). The relay LSBs may be associated with LSBs for the second WTRU and may be associated with the session key identifier.

In V2X examples, there may be a privacy requirement that may state that the application layer ID and Layer 2 (L2) ID need to be changed over time. This may ensure that the WTRU may not be tracked or identified by other WTRUs. The eV2X WTRU IP address/prefix may be (e.g., may also be) changed if IP communication is used. In examples, a Link Identifier Update (LIU) procedure may be used to change the IDs on a WTRU.

In LIU procedure examples, peer WTRUs may change their IDs during the same procedure run (e.g., both WTRUs may change their identifiers at the same time to avoid linkability issues). There may be a linkability issue if a WTRU (e.g., only one WTRU) changes its ID. In examples, a malicious WTRU may track eV2X WTRUs by determining that WTRU1 IDs may have changed to values (e.g., new values) by linking them with WTRU1 peer WTRU IDs.

In examples, the security IDs/session key identifiers (e.g., MSBs/LSBs of Knrp-sess ID) may (e.g., may also) change when changing the other IDs.

Security IDs/session key identifiers may be the Knrp-sess ID. The MSBs of Knrp-sess ID may be defined by the source WTRU (e.g., sending a DCR message). The LSBs of Knrp-sess ID may be defined by the responding WTRU (e.g., sending a DSM Command message).

During the PC5 unicast link establishment, a WTRU (e.g., each WTRU) may validate that the MSBs/LSBs of Knrp-sess ID may be locally unique. The MSBs/LSBs of Knrp-sess ID may be sent in cleartext with a packet (e.g., each packet) and may be used at the PDCP layer to retrieve the security context associated with a PC5 unicast link. The security context may include the keys derived for (de)encryption, integrity protection/validation, etc.

The LIU procedure may be used to change both peer WTRUs IDs, for example, L2 IDs and the MSBs/LSBs of Knrp-sess ID (e.g., security IDs/session key identifiers).

Figure 2:
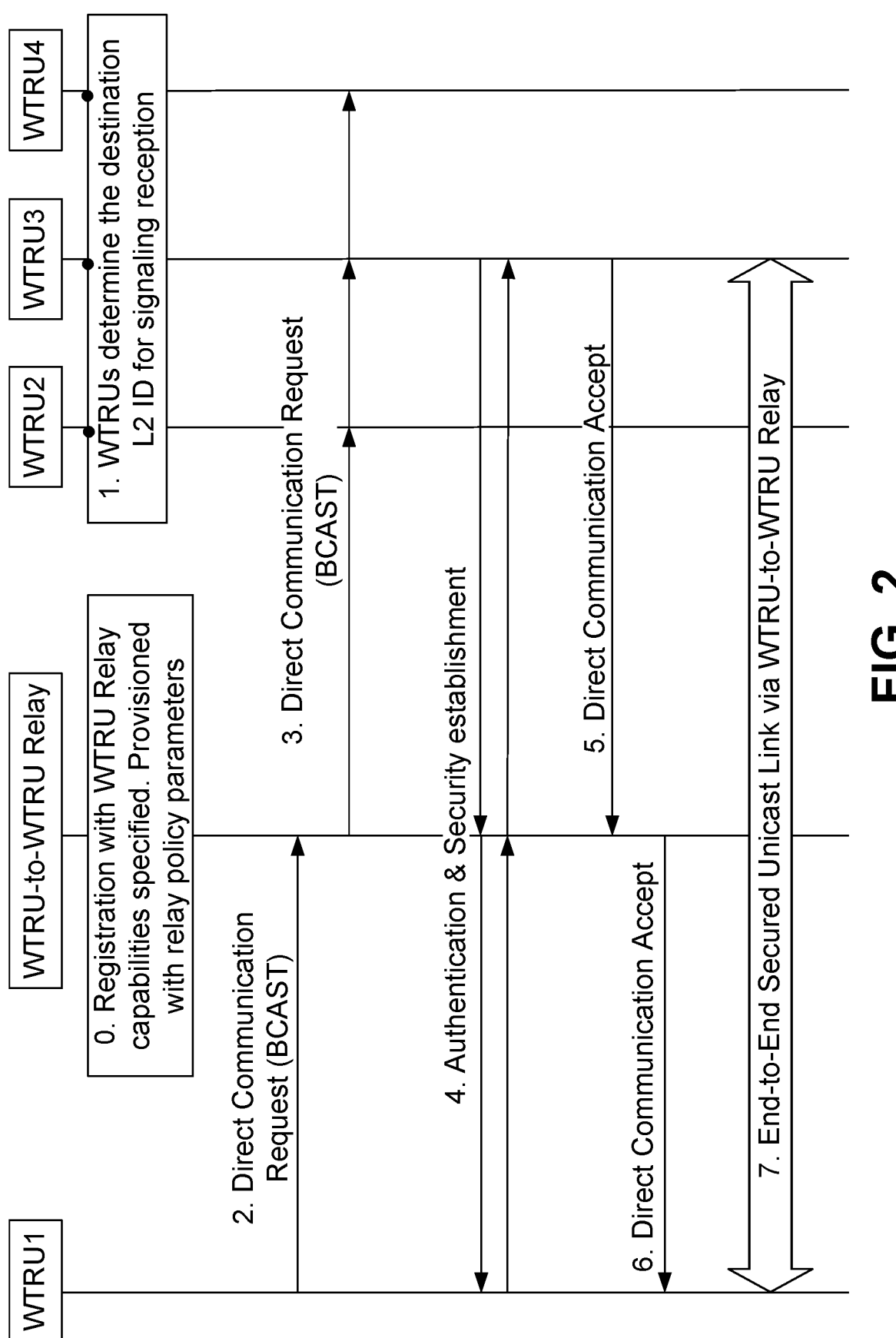
FIG. 2 illustrates an example of a Layer 2 (L2) WTRU-to-WTRU relay.

FIG. 2 illustrates an example of an L2 WTRU-to-WTRU relay. A secured (e.g., "extended") PC5 link may be set up between the source WTRU and the target WTRU via the WTRU-to-WTRU relay. The source/target WTRUs may send messages to the WTRU-to-WTRU relay and may receive messages from the WTRU-to-WTRU relay. In examples, the security association and the PC5 unicast link may be established (e.g., established directly) between the source WTRU and target WTRU. The source/target WTRUs may detect that the communication may be going through a WTRU-to-WTRU relay if the source/target WTRUs detect a relay indication and/or relay identifier (RID) included in the received messages.

The source/target WTRUs may use a link (e.g., a unique link and/or a per-hop link) to send messages toward a specific relay. For example, if a source WTRU communicates with two target/peer WTRUs (e.g., WTRU2 and WTRU3) via the same relay, then the source WTRU may use the same per-hop link to send messages toward its peer WTRUs. The per-hop link may be identified by a pair of L2 IDs. The specific end-to-end unicast links (e.g., between source WTRU-WTRU2 and source WTRU-WTRU3) may be differentiated by using an adaptation layer header. The adaptation layer header may include information identifying the specific source/target WTRUs.

The WTRU-to-WTRU relay may maintain a mapping table including the mapping of peer WTRUs end-to-end IDs and the corresponding relay-L2 IDs that have been self-assigned. If the WTRU-to-WTRU relay receives a message, the WTRU-to-WTRU relay may use its mappings table to find the end-to-end source and destination IDs to be used to forward the received message to the target WTRU. The WTRU-to WTRU relay may update the source and destination L2 ID fields of the received message to the target per-hop link and the end-to-end IDs specified in the adaptation header with its corresponding WTRU's ID and relay ID before forwarding the message.

The relay may receive messages from a source/target WTRU to be relayed to a target/source WTRU. The relay may first update the source/destination L2 IDs to the per-hop IDs that may indicate where to send the messages. The relay may allocate specific IDs for the source/target WTRUs used to replace the IDs specified in the adaptation header. The source/target WTRUs may not know their peer WTRU end-to-end IDs.

In examples, a management unicast link may be established between the WTRU (e.g., source and/or target WTRU) and the relay WTRU. This unicast link may be used to manage associated extended links going through the relay WTRU. The extended links may be associated with the same RID as the management link. The management link may be secured (e.g., integrity and confidentiality protected) between the source and/or target WTRU and the relay WTRU, for example, between the WTRU1 and the WTRU-to-WTRU relay in FIG. 2 (the management link is not shown). For example, the source WTRU and its peer WTRU may need to change their identifiers. The management link may be used between the source/target WTRUs and the relay to inform the relay about the IDs (e.g., new IDs) to be used at the source/target WTRUs.

A WTRU (e.g., WTRU1) may have a per-hop link to a relay. The WTRU (e.g., WTRU1) may have an E2E PC5 unicast link with a peer WTRU (e.g., WTRU2). A privacy trigger may occur on WTRU1 (e.g., a privacy timer expires). IDs (e.g., all IDs) may need to be changed (e.g., at the same time) and on both peer WTRUs. Changing IDs on both sides may be needed to avoid linkability of unchanged IDs to (e.g., new) IDs. IDs (e.g., new IDs and unchanged IDs) may be sent in cleartext with messages (e.g., all messages) and may be visible to everyone.

Considering the relayed E2E connections, E2E IDs (e.g., new E2E IDs) may be introduced in the adaptation header. The E2E IDs (e.g., new E2E IDs) may need to be changed during the same procedure since these identifiers may be sent in cleartext. IDs (e.g., all IDs) may be changed at the same time, for example, per-hop L2 IDs, E2E IDs, and/or E2E security IDs/session key identifiers. WTRU1, relay WTRU, and/or WTRU2 may be involved in the identifiers update procedure.

The current LIU procedure/messages may handle the change of L2 IDs and security IDs/session key identifiers for a direct unicast link. The current LIU procedure/messages may not handle the change of E2E IDs that are transported in cleartext and may be (e.g., may need to be) privacy protected.

WTRU1 may have established E2E links via the relay with multiple peer WTRUs (e.g., WTRU2, WTRU3, . . . , WTRUn). A privacy update procedure may be triggered on WTRU1. The change of IDs (e.g., per hop L2 IDs, E2E IDs, and/or E2E security IDs/session key identifiers) at WTRU1 may affect its E2E peer WTRUs and the relay (e.g., for forwarding table), potentially causing a signaling storm due to an exchange (e.g., a massive exchange) of PC5-S messages at the same time.

Source WTRU (S-WTRU) and target WTRU (T-WTRU) may be used to identify peer WTRUs. S-WTRU and T-WTRU terminology may be provided as follows: S-WTRU may be called: initiating WTRU, source WTRU, peer WTRU, and/or WTRU1. T-WTRU may be called: responding WTRU, target WTRU, peer WTRU, destination WTRU, and/or WTRU2.

A WTRU-to-WTRU relay may be a WTRU behaving as a relay between two peer WTRUs. Terminology for a WTRU-to-WTRU relay may be provided as follows: R-WTRU, relay WTRU, and/or relay. A PC5 unicast link established between two WTRUs via a WTRU-to-WTRU relay may be called an E2E link. Terminology for E2E link may be provided as follows: E2e link, e2e link, or E2E link. E2E link IDs terminology may include, e.g.: E2E IDs (e.g. E2E L2 IDs uniquely identifying an E2E link) and E2E security info/IDs/session key identifiers (e.g., MSBs and LSBs of Knrp-sess ID).

If a WTRU changes its IDs, the relay and its peer WTRUs may need to change their IDs (e.g., at the same time). This may create a signaling storm of PC5-S message exchanges. The E2E links may be isolated on a per-hop basis (e.g., to avoid this situation). For example, E2E link IDs, which are sent in cleartext (e.g., in the header of the message), may be specific to the per-hop link. This may be handled at the relay by replacing the received E2E link IDs with corresponding relay-specific IDs (e.g., S-WTRU's E2E ID (e.g., ID1)) and E2E MSBs of Knrp-sess ID (e.g., MSBs1) may be replaced by relay-specific E2E IDs (e.g. R-ID1) and relay-specific MSBs of Knrp-sess ID (e.g., R-MSBs1)). E2E peer WTRUs may not know their peer WTRU's IDs. If IDs need to be changed on a WTRU, the IDs used between this WTRU (e.g., the WTRU onto which the IDs need to be changed) and the relay may be updated. The relay may update its mapping table. For example, the relay may generate IDs (e.g., new IDs) and associate them with their corresponding IDs used with E2E peer WTRUs. The peer WTRUs may not be (e.g., may not need to be) involved in the LIU procedure if triggered on the source WTRU. WTRUs (e.g., all WTRUs) may trigger the LIU procedure if needed (e.g., when a trigger is received), which may involve the relay. E2E peer WTRUs' IDs may be decoupled at the relay, which may ensure that E2E peer WTRUs' IDs are not transmitted together within the same packet header(s). This may provide a mitigation mechanism against linkability attacks on communicating E2E peer WTRUs.

In examples, the application layer ID and the IP address/prefix may be changed periodically. The application layer ID and the IP address/prefix may not be replaced by the relay to be isolated on the per-hop since they are not exchanged in the message header. The link modification procedure may be executed with the concerned peer WTRUs during (e.g., before completion of) the LIU procedure between the WTRU and the relay. If IP communication is used, the LIU procedure may be triggered due to the change of application layer ID and IP address/prefix.

In examples, the LIU messages may be modified to add E2E IDs parameters (e.g., add new E2E IDs parameters). The relay may receive E2E IDs (e.g., new E2E IDs) and E2E security IDs (e.g., new E2E security IDs/session key identifiers) from the WTRU in addition to the per-hop L2 IDs (e.g., new per-hop L2 IDs). The relay may change its own relay-specific IDs used on this hop and mapping to the WTRU's IDs (e.g., E2E IDs, E2E security IDs/session key identifiers). The relay may change its per-hop L2 ID. The relay may send back its IDs (e.g., new IDs) to the WTRU.

In examples, E2E links IDs may be isolated on a per-hop basis to keep LIU procedure execution between the WTRU and the relay (e.g., without involving E2E peer WTRUs).

The relay may replace the E2E IDs and E2E security IDs/session key identifiers with relay-specific IDs if forwarding messages on another hop. In examples, E2E link IDs (e.g., E2E IDs and E2E security IDs/session key identifiers) may be specified in the adaptation header. In examples, E2E security IDs/session key identifiers may be specified in the PDCP header.

The LIU procedure may be executed between the WTRU and the relay, on a per-hop basis, without involving the peer WTRUs. In examples, this may prevent a massive exchange of messages that may be incurred using a "conventional link ID update" procedure. The LIU procedure may be executed over the protected management link to allow the exchange of secured messages between the WTRU and the relay.

In examples, link modification messages may be modified to add parameters (e.g., new parameters). The source WTRU may receive an application layer ID (e.g., new application layer ID) and a IP address/prefix (e.g., new IP address/prefix) from the application layer. The source WTRU may trigger the LIU procedure with the relay (e.g., to change the per-hop link and E2E link IDs), since a change of application layer ID may trigger the change of IDs associated with it. The source WTRU may trigger a link modification procedure with the concerned E2E peer WTRUs (e.g., to inform them about its new application layer ID and possibly new IP address/prefix) prior to the completion of the LIU procedure with the relay, for example.

E2E link IDs may be isolated on a per-hop basis. The relay may replace the L2 IDs identifying the per-hop link with other relay-specific per-hop IDs. The relay may replace the E2E IDs specified in the adaptation header with relay-specific E2E IDs (e.g., when forwarding messages). For example, E2E WTRUs may identify the target WTRU by specifying a relay-specific E2E ID in the adaptation header (e.g., when sending message(s)).

Security information may be replaced by the relay (e.g., since it is transported in the cleartext in the header of each message). Replacing the security information before forwarding a message may enable the relay to isolate (e.g., completely isolate) the E2E link IDs between the WTRU and the relay. This may limit the periodic change of IDs on a per-hop basis, for example, without involving peer WTRUs.

Security IDs/session key identifiers (e.g., MSBs/LSBs of Knrp-sess ID) may be exchanged between E2E peer WTRUs, for example, during the E2E PC5 unicast link establishment. For example, the source WTRU may send a DCR message with the MSBs of Knrp-sess ID specified in the payload of the message and the peer WTRU may reply by sending a DSM Command message that includes the LSBs of Knrp-sess ID in the payload. At this point (e.g., during the sending of these two messages), the security information may not be specified in the header of the messages. The security information may not be accessible at the relay.

In examples, the relay may not have access to the MSBs/LSBs of Knrp-sess ID. The relay may not be able to replace the MSBs/LSBs of Knrp-sess ID before forwarding the DCR/DSM Command messages. The E2E peer WTRUs may receive and locally keep their E2E peer security IDs. The E2E peer WTRUs may be involved in the identifier update.

In examples with direct re-keying, the E2E WTRUs may update their Knrp-sess keys locally and exchange their MSBs/LSBs of Knrp-sess ID (e.g., new MSBs/LSBs of Knrp-sess ID) within the payload of the Direct Re-keying Request (DRR) and DSM Command messages. The relay may not have access to the MSBs/LSBs of Knrp-sess ID. The relay may not be able to replace the MSBs/LSBs of Knrp-sess ID before forwarding the DRR/DSM Command messages.

The E2E peer WTRUs may specify the E2E MSBs/LSBs of Knrp-sess ID in the adaptation header when sending DCR, DRR, or DSM Command messages (e.g., to enable the replacement of E2E MSBs/LSBs of Knrp-sess ID at the Relay). The E2E peer WTRUs may specify (e.g., may also specify) the E2E MSBs/LSBs of Knrp-sess ID in the payload (e.g., when sending DCR, DRR, or DSM Command messages). These examples may enable the relay to replace the E2E MSBs/LSBs of Knrp-sess ID with relay-specific MSBs/LSBs values when forwarding messages. A WTRU may decide to send a message which may be forwarded by a relay (e.g., a message that may only be forwarded by a relay). Such a message may be one that a receiving WTRU may not consider. In this case, a for relay indication (e.g., a relay only indication) may be specified in the message (e.g., payload or header) and the E2E security IDs/session key identifiers may be specified in the adaptation header (e.g., only in the adaptation header and not in the payload).

The E2E peer WTRUs receiving DCR, DRR, or DSM Command messages, with security IDs/session key identifiers specified (1) in the payload and (2) in the adaptation header, may determine which values of the security IDs should be used (e.g., from the adaptation header or the payload) by verifying if the message has been received directly from the peer WTRU or if the message has been received via a relay. If the message is received directly from the peer WTRU, then the receiving WTRU may use the security IDs as specified in the payload. If the message is received via a relay, the receiving WTRU may use the security IDs as specified in the adaptation header and may not consider the information received in the payload. The Access Stratum (AS) layer may pass the information specified in the adaptation header (e.g., security IDs/session key identifiers, E2E IDs) to the ProSe layer when PC5 messages are received (e.g., DCR, DRR, DSM Command messages). The security IDs/session key identifiers specified in the adaptation header (e.g., with DCR, DRR, DSM Command messages) may continue to be sent in the adaptation header with other PC5-S messages or data messages over a PC5 unicast link, and/or they may be specified in the PDCP header. The ProSe layer on the E2E WTRUs may pass the security IDs/session key identifiers (e.g., MSBs/LSBs of Knrp-sess ID as received/specified onto the adaptation header with the DCR/DRR and DSM Command messages) to the AS layer.

Figure 3:
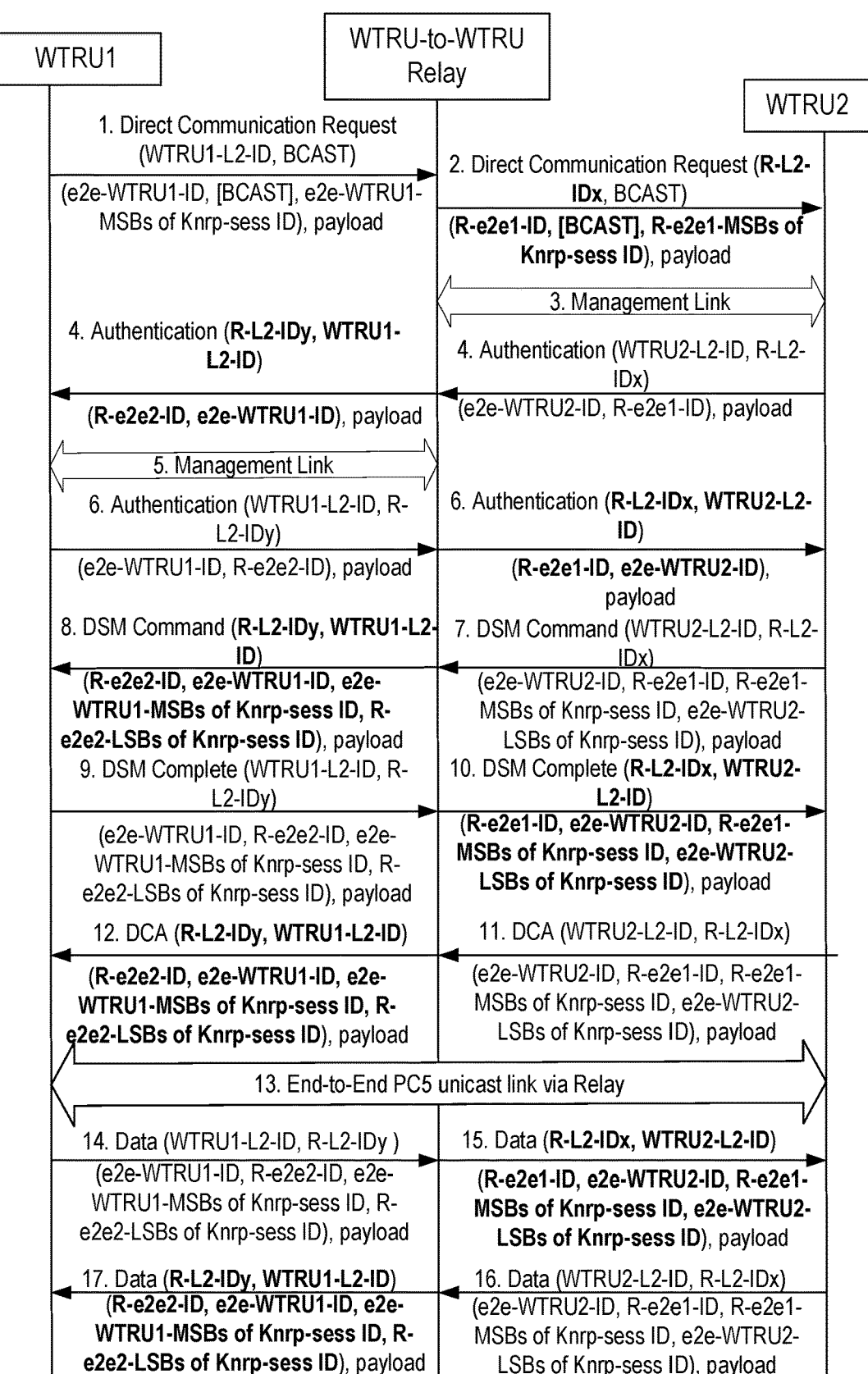
FIG. 3 shows an example of an end-to-end (E2E) link establishment.

FIG. 3 shows an example of E2E link establishment (e.g., via relay and forwarding). One or more of the actions illustrated may be performed. This may include replacement of E2E IDs and per-hop L2 IDs at the relay (e.g., relay WTRU). The parameters shown in bold may be replaced by the relay (e.g., relay WTRU). Parameters above the arrows may show the per-hop L2 IDs. Parameters below the arrows may show the E2E IDs (e.g., E2E L2 IDs, E2E security IDs/session key identifiers) specified in the adaptation header and PDCP header.

At 1, WTRU1 may broadcast a DCR message (e.g., a first message). WTRU1 may specify WTRU1-L2-ID as the source ID for the per-hop link. WTRU1 may specify BCAST (e.g., a broadcast value) as the destination ID for the per-hop link. WTRU1 may generate and specify an E2E ID (e.g., e2e-WTRU1-ID) in the adaptation header. WTRU1 may generate and specify MSBs of Knrp-sess ID (e.g., a session key identifier) in the adaptation header. The MSBs of Knrp-sess ID for WTRU1 may be indicated by the DCR message (e.g., may be put in the payload of the DCR message), for example, in case the message may be directly received from a peer WTRU (e.g., not received via a relay). In this case (e.g., in cases for direct communication), the peer WTRU may not look at the adaptation header. BCAST may be specified in the adaptation header for the E2E destination ID (e.g., or the E2E destination ID may be unspecified, which may imply for all WTRUs), for example, since the message may be for broadcast and not destined to a specific WTRU.

WTRU1 may specify the MSBs of Knrp-sess ID in the adaptation header (e.g., only in the adaptation header and not in the payload) if it adds an indication (e.g., for-relay-only). This means that the DCR message may be processed (e.g., may only be processed) by a relay (e.g., relay WTRU) (e.g., not for direct communication).

WTRU1 may want to send a broadcast DCR message via a specific relay (e.g., a relay WTRU), using an existing per-hop link. The E2E destination in the adaptation header, for example, in this case, may be set to BCAST while the per-hop destination ID may be set to this specific relay per-hop ID. WTRU1 may, for example, select the relay (e.g., relay WTRU) to be used for communication with responding WTRUs (e.g., WTRU2).

In examples, WTRU1 may already know its peer WTRU's E2E ID and may send a message to this specific WTRU. The specific WTRU's E2E ID, for example, may be specified in the adaptation header.

At 2, the relay (e.g., relay WTRU) may receive the broadcasted DCR message and replace the per-hop source ID with a newly allocated one (e.g., R-L2-IDx). The relay (e.g., relay WTRU) may replace the source E2E ID and MSBs of Knrp-sess ID, specified in the adaptation header, with relay specific IDs (e.g., relay E2E ID and relay MSBs) mapping to the E2E ID and the MSBs of Knrp-sess ID (e.g., the session key identifier) for WTRU1 (e.g., R-e2e1-ID and R-e2e1-MSBs of Knrp-sess ID). The relay (e.g., relay WTRU) may add (e.g., may also add) its RID (e.g., in the adaptation layer). The relay may send a second message (e.g., may re-broadcast the DCR message) (e.g., many relays may receive the message and re-broadcast it) indicating the relay specific IDs (e.g., R-e2e1-ID and R-e2e1-MSBs of Knrp-sess ID). In this case, the responding WTRU (e.g., WTRU2) may select the relay to be used for communication with WTRU1.

If the relay (e.g., relay WTRU) receives a DCR message which is not broadcasted (e.g., sent on an existing per-hop link between WTRU1 and the relay (e.g., relay WTRU)), the relay (e.g., relay WTRU) may look at the destination ID specified in the adaptation header. If destination ID is BCAST or if nothing is specified as the E2E destination ID, the relay (e.g., relay WTRU) may have behavior as described above. For example, the relay (e.g., relay WTRU) may allocate itself a per-hop ID to re-broadcast the message (e.g., source per-hop ID) and may replace e2e-WTRU1-ID and e2e-WTRU1-MSBs of Knrp-sess ID with relay specific IDs/session key identifiers.

If the DCR message is sent to a specific E2E peer WTRU ID, the relay may search in its mapping table if a per-hop link already exists and is associated with the specified destination E2E WTRU ID. If such a per-hop link exists, the message may be forwarded over this per-hop link with the relay-specific per-hop ID. If such a per-hop link does not exist, the message may be forwarded as a broadcast in the per-hop destination ID and specific E2E WTRU ID as the destination in the adaptation header.

At 3, WTRU2 may receive the DCR message. The AS layer may pass the E2E IDs specified in the adaptation layer, the MSBs of Knrp-sess ID, and the RID to the ProSe layer (e.g., together with the DCR message). WTRU2 may verify if the message has been received from a relay (e.g., relay WTRU). In examples, WTRU2 may keep track of the MSBs of Knrp-sess ID value as specified in the adaptation header and not the MSBs value from the payload. WTRU2 may verify if it already has a per-hop link established with this relay (e.g., relay WTRU). If not, WTRU2 may first establish a management link with this relay (e.g., relay WTRU) and trigger the authentication procedure, for example, to authenticate the relay (e.g., relay WTRU) and be authenticated by the relay (e.g., relay WTRU).

If the relay authentication fails while establishing the management link, WTRU2 may drop the received DCR message.

If a specific E2E ID is specified as the destination in the adaptation header, WTRU2 may verify if this E2E ID is its own E2E ID (e.g., a previous E2E ID used with WTRU1). If not, WTRU2 may drop the DCR message.

If WTRU2 receives the message (e.g., DCR) directly from WTRU1 (e.g., not from a relay), then WTRU1 may use the MSBs of Knrp-sess ID value specified in the payload. In this case, the values specified in the adaptation layer and in the payload may be identical.

At 4, if the management link is established, WTRU2 may reply to WTRU1 by triggering the authentication procedure via the relay (e.g., relay WTRU). WTRU2 may include the RID in the authentication message. WTRU2 may allocate an e2e-WTRU2-ID, which may be specified in the adaptation header (e.g., together with the received R-e2e1-ID). A per-hop link may be established with the relay (e.g., relay WTRU) at the same time (e.g., WTRU2 may allocate a per-hop L2 ID and reply to the relay's per-hop L2 ID). The relay (e.g., relay WTRU) may forward the authentication message to WTRU1 via the per-hop link (e.g., it may allocate a R-L2-IDy and replace the source and target IDs with WTRU1-L2-ID and R-L2-IDy). The IDs in the adaptation header may be replaced with e2e-WTRU1-ID (e.g., previously received from WTRU1) and R-e2e2-ID (e.g., relay allocated ID mapping to WTRU2). WTRU1 may reply (e.g., may later reply) to the authentication message via the per-hop link with the relay (e.g., relay WTRU).

At 5, WTRU1 may receive the authentication message. AS layer may pass the E2E IDs specified in the adaptation layer and the RID to the ProSe layer (e.g., together with the message). WTRU1 may keep track of the information received in the header and the message. WTRU1 may verify if it already has a management link. If not, WTRU1 may trigger the management link establishment and run the authentication procedure with this relay (e.g., relay WTRU).

In examples, the management link may be established after the authentication procedure is completed successfully (e.g., after 6 or 8).

At 6, if the management link is established, WTRU1 may reply to WTRU2 (e.g., it may send an authentication response via the per-hop link with the relay and specify its e2e-WTRU1-ID and R-e2e2-ID in the adaptation header). The relay (e.g., relay WTRU) may look at the destination ID specified in the adaptation header and find the related mappings entry. The relay (e.g., relay WTRU) may replace the IDs in the adaptation header with these values (e.g., e2e-WTRU2-ID and R-e2e1-ID) and forward the message to WTRU2.

At 7, WTRU2 may trigger the security establishment procedure with WTRU1 via the relay (e.g., the relay WTRU). WTRU2 may generate LSBs of Knrp-sess ID (e.g., the session key identifier) and specify it in the adaptation header (e.g., in addition to putting it in the payload of the message). R-e2e1-ID and e2e-WTRU2-ID may be specified (e.g., may also be specified) in the adaptation header. R-e2e1-MSB of Knrp-sess ID, which may be received in the DCR message, may be specified in the PDCP header. WTRU2 may send the DSM command message (e.g., a third message) to the relay (e.g., the relay WTRU) via the per-hop link.

R-e2e1-MSB of Knrp-sess ID, which may be received on the DCR message, may instead, or in addition, be specified in the adaptation header.

At 8, the relay (e.g., the relay WTRU) may forward the DSM command message (e.g., the third message) to WTRU1 and replace the per-hop IDs with the IDs used with WTRU1. The relay may replace (e.g., may also replace) the IDs specified in the adaptation header and IDs specified in the PDCP header with relay specific IDs (e.g., relay LSBs) mapping to WTRU2. e2e-WTRU2-ID may be replaced with R-e2e2-ID and R-e2e1-ID may be replaced with e2e-UE1-ID. The relay may generate a relay-specific ID (e.g., a new relay-specific ID), for example, that may be associated with (e.g., may replace) WTRU2 LSBs of Knrp-sess ID (e.g., R-e2e2-LSBs of Knrp-sess ID). The relay LSBs of Knrp-sess for WTRU2 may be indicated in the PDCP header (or in the adaptation header) of the DSM command message.

The relay (e.g., relay WTRU) may ensure that the relay-specific LSBs of Knrp-sess ID replacing WTRU2's LSBs of Knrp-sess ID are unique. For example, the relay (e.g., relay WTRU) may ensure that the relay-specific LSBs of Knrp-sess ID have not been used to replace the ID of another WTRU (e.g. WTRU3) replying (e.g., also replying) to WTRU1's DCR message.

The relay (e.g., relay WTRU) may generate a relay-specific (e.g., a new relay-specific ID) LSBs of Knrp-sess ID if receiving a message from WTRU2 specifying LSBs (e.g., new LSBs) of Knrp-sess ID value in the adaptation layer (e.g., a new DSM command message may be sent as a response to a DSM reject message or to update the IDs periodically).

At 9, WTRU1 may receive the DSM command message. AS layer may pass the E2E IDs specified in the adaptation layer, the LSBs of Knrp-sess ID, and/or the RID to the ProSe layer (e.g., together with the message). WTRU1 may keep track of the LSBs of Knrp-sess ID value as specified in the adaptation header, for example, and not the LSBs values from the payload. WTRU1 may keep (e.g., may also keep) track of the received E2E IDs in the adaptation header and reply by sending a DSM complete message via the per-hop link with the relay (e.g. relay WTRU). The adaptation header may include e2e-WTRU1-ID and R-e2e2-ID. The MSBs of Knrp-sess ID and LSBs of Knrp-sess ID (e.g., e2e-WTRU1-MSBs of Knrp-sess ID and R-e2e2-LSBs of Knrp-sess ID) may be specified in the PDCP header (e.g., or may instead, or in addition, be specified in the adaptation header).

WTRU1 may check if the received LSBs of Knrp-sess ID (e.g., R-e2e2-LSBs of Knrp-sess ID) may be unique. For example, the WTRU1 may check that the same LSBs of Knrp-sess ID, which may be locally associated with the MSBs of Knrp-sess ID, have not been received already by another WTRU and/or another relay (e.g., relay WTRU). If the received LSBs of Knrp-sess ID are not unique, WTRU1 may send a DSM reject message.

The relay (e.g., relay WTRU) may generate a relay-specific (e.g., a new relay-specific) MSBs of Knrp-sess ID if receiving a message from WTRU1 specifying a new MSBs of Knrp-sess ID in the adaptation header. For example, the relay (e.g., relay WTRU) may specify MSBs of Knrp-sess ID (e.g., new MSBs of Knrp-ness ID) values in the adaptation layer (e.g., a DSM complete message may be sent to update the IDs periodically).

At 10, the relay (e.g., relay WTRU) may replace WTRU1's IDs with its relay-specific IDs mapping to WTRU1. The relay (e.g., relay WTRU) may replace the relay-specific IDs mapping to WTRU2 with WTRU2's IDs and forward the message to WTRU2, for example, via the per-hop link with WTRU2.

At 11, WTRU2 may receive the DSM complete message. The WTRU2 may complete the E2E PC5 unicast link establishment, for example, by sending a DCA message. The message may be sent via the per-hop link with the relay (e.g., relay WTRU) and include IDs in the adaptation header to identify WTRU1. The MSBs/LSBs of Knrp-sess ID may be specified in the PDCP header (e.g., e2e-UE2-LSBs of Knrp-sess ID and R-e2e1-MSBs of Knrp-sess ID).

At 12, the relay (e.g., relay WTRU) may replace WTRU2's IDs with its relay-specific IDs mapping to WTRU2. The relay (e.g., relay WTRU) may replace the relay-specific IDs mapping to WTRU1 with WTRU1's IDs and forward the message to WTRU1, for example, via the per-hop link with WTRU1.

At 13, E2E PC5 unicast link may be established between WTRU1 and WTRU2 via the relay (e.g., relay WTRU). The link may be secured E2E. Identifiers for the per-hop links and E2E link may be unique (e.g., may all be unique) per per-hop link. For example, the relay (e.g., relay WTRU) may replace IDs (e.g., all IDs), for example, before forwarding them to isolate the E2E links on a per-hop basis.

At 14-17, WTRU1/WTRU2 may exchange data via the relay (e.g., relay WTRU). The relay (e.g., relay WTRU) may replace the IDs based on its mapping table before forwarding them. The messages may be secured E2E. WTRU1 may locate the corresponding Knrp-sess ID locally using e2e-WTRU1-MSBs of Knrp-sess ID concatenated with R-e2e2-LSBs of Knrp-sess ID while WTRU2 may locate the corresponding Knrp-sess ID locally using R-e2e1-MSBs of Knrp-sess ID concatenated with e2e-WTRU2-LSBs of Knrp-sess ID. In examples, at 14, the relay (e.g., the relay WTRU) may receive a fourth message from WTRU1. The fourth message may indicate data (e.g., a first data) to be sent to WTRU2, indicate relay LSBs (e.g., R-e2e2-LSBs of Knrp-sess), and indicate MSBs for WTRU1 (e.g., e2e-WTRU1-MSBs of Knrp-sess ID). In examples, at 15, the relay (e.g., the relay WTRU) may send a fifth message to WTRU2. The fifth message may indicate data (e.g., the first data) to be sent to WTRU2, indicate relay MSBs (e.g., R-e2e1-MSBs of Knrp-sess ID), and indicate LSBs for WTRU2 (e.g., e2e-WTRU2-LSB of Knrp-sess ID). In examples, at 16, the relay (e.g., the relay WTRU) may receive a sixth message from WTRU2. The sixth message may indicate data (e.g., a second data) to be sent to the WTRU1, indicate relay MSBs (e.g., R-e2e1-MSBs of Knrp-sess ID), and indicate LSBs for WTRU2 (e.g., e2e-WTRU2-LSB of Knrp-sess ID). In examples, at 17, the relay (e.g., the relay WTRU) may send a seventh message to WTRU1. The seventh message may indicate data (e.g., the second data) to be sent to WTRU1, indicate relay LSBs (e.g., R-e2e2-LSBs of Knrp-sess), and indicate MSBs for WTRU1 (e.g., e2e-WTRU1-MSBs of Knrp-sess ID).

A LIU procedure via a management link may be performed. If a trigger for privacy occurs on a WTRU, the LIU procedure may be re-used between the WTRU and the relay (e.g., relay WTRU) to update identifiers (e.g., all identifiers) used on the per-hop link. For example, the identifiers used over this per-hop link may be the per-hop IDs and E2E link IDs (e.g., all E2E link IDs such as E2E IDs and E2E security IDs/session key identifiers). A privacy timer may be started on a per-hop link establishment basis or on an E2E link establishment basis.

Source/destination L2 IDs and security IDs/session key identifiers (e.g., new source/destination L2 IDs and security IDs/session key identifiers), such as MSBs and LSBs of Knrp-sess ID, may be generated and exchanged between peer WTRUs using the LIU messages. The LUI messages may be designed for direct PC5 unicast link (e.g., designed only for direct PC5 unicast link). To support the change of identifiers for E2E PC5 unicast links, the LIU messages may be modified to carry the per-hop link IDs, E2E link IDs, and/or a request number. The E2E ID (e.g., new E2E ID) and security IDs/session key identifiers (e.g., new security IDs/session key identifiers such as MSBs or LSBs of Knrp-sess ID) may be specified (e.g., may also be specified) in the message. If multiple E2E link IDs are changed, multiple E2E IDs and E2E security IDs/session key identifiers may be specified in the LIU messages. The LIU messages may be modified to include: the current per-hop link IDs, the WTRU per-hop ID (e.g., WTRU new per-hop ID), a list of {current E2E IDs, associated security IDs/session key identifiers, WTRU E2E ID (e.g., WTRU new E2E ID), and/or WTRU security IDs/session key identifiers (e.g., WTRU new security IDs/session key identifiers)} and/or a number. The WTRU security IDs/session key identifiers (e.g., new security IDs/session key identifiers) may be the MSBs or LSBs of Knrp-sess ID, depending on if the WTRU has initiated the link establishment (e.g., has sent the DCR message to establish the E2E link) or if the WTRU has responded to the DCR message.

The relay (e.g., the relay WTRU) may find the specified per-hop entry, for example, from its mapping table. The relay (e.g., relay WTRU) may find the specified E2E links, and change the relay-specific IDs/session key identifiers used with the WTRU and mapped to E2E peer WTRUs, e.g. R-e2e2-ID and R-e2e2-LSBs of Knrp-sess ID. This may be done for multiple E2E peer WTRUs. The relay (e.g., relay WTRU) may change (e.g., may also change) its per-hop L2 ID used with the WTRU.

If the WTRU initiating the LIU procedure has E2E unicast links (e.g., many unicast links) established via the relay (e.g., relay WTRU), the WTRU may send multiple LIU request messages to the relay (e.g., relay WTRU). The relay (e.g., relay WTRU) may handle the multiple LIU request messages, for example, in this case. The relay (e.g., relay WTRU) may change its related IDs and replies with an LIU response message, for example, for each of the received LIU request messages. If IDs (e.g., all IDs) are changed, the WTRU which initiated the procedure may send an LIU Ack message. The LIU Ack may acknowledges response messages (e.g., all response messages). A number may be added to the Ack message to indicate the number of responses that are acknowledged. The relay (e.g., relay WTRU) may validate that the received number is correct, (e.g., corresponds to the number of responses sent) and if the number is not correct, the relay (e.g., relay WTRU) may retransmit the response messages or release the per-hop link or E2E link that have not been acknowledged.

Figure 4:
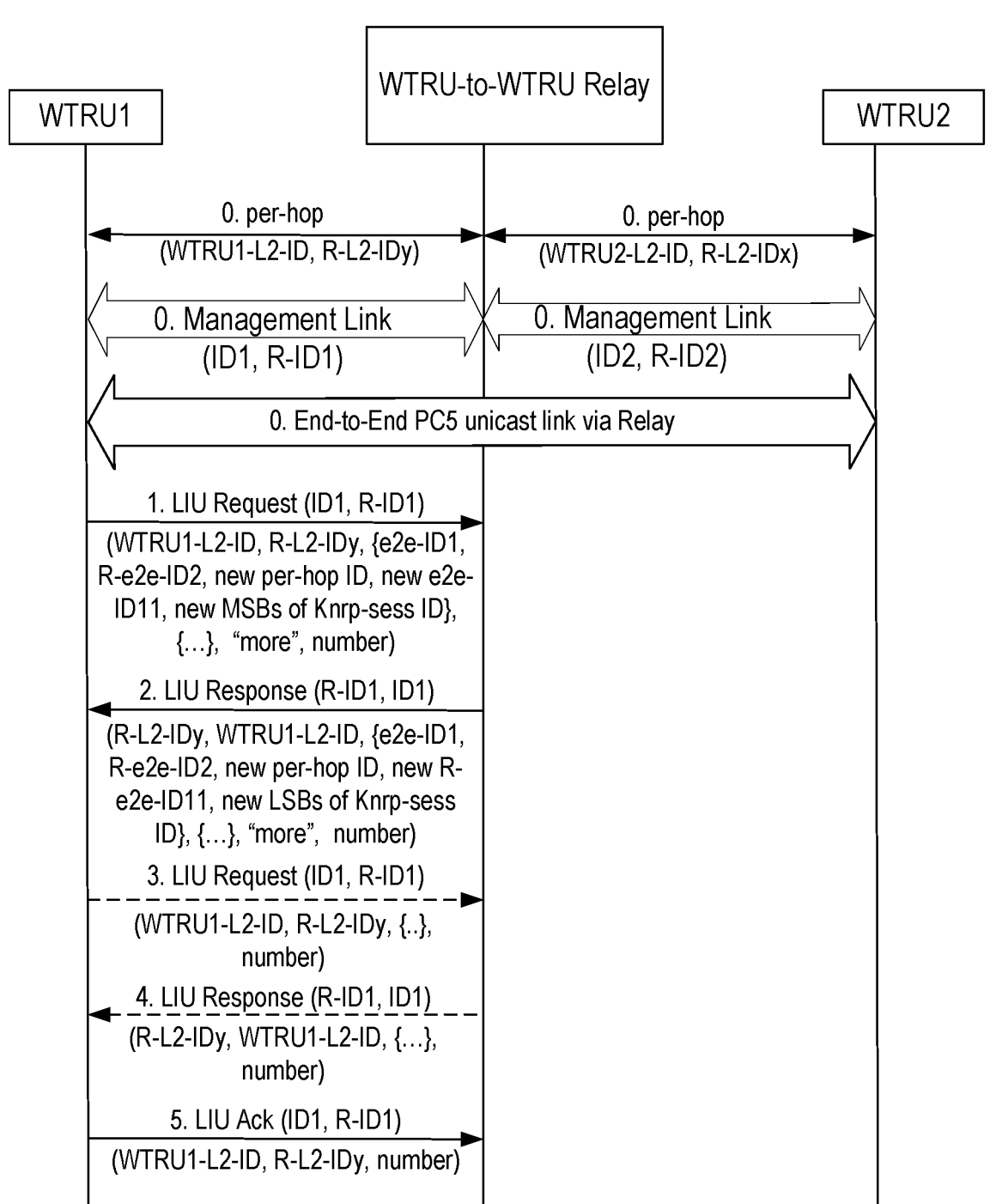
FIG. 4 shows an example of a Linked Identifier Update (LIU) procedure isolated on a per-hop link basis.

FIG. 4 shows an example of a LIU procedure isolated on a per-hop link basis. One or more of the actions illustrated may be performed. Instead or in addition to the number of responses that are acknowledged, a list of numbers may be specified in the Ack message (e.g., each request message may be associated with a number that is repeated in the response message).

The LIU procedure may be run between the WTRU and the relay using the management link. The messages may be modified to indicate that the LIU applies to another link (e.g., not the management link per se).

Since the identifiers that are changed may be known (e.g., may only be known) by the WTRU and the relay, E2E peer WTRUs may not be (e.g., may not need to be) involved in this procedure.

At 0, WTRU1 may have a per-hop link with the relay and may have an E2E PC5 unicast link established with WTRU2 and possibly other WTRUs not shown in FIG. 4. WTRU1 may have (e.g., may also have) a management link established with the relay. This management link may be a PC5 unicast link with security enabled (e.g., with integrity and confidentiality protection). WTRU2 may have (e.g., may also have) a per-hop link and a PC5 unicast management link established with the relay.

At 1, WTRU1 may receive a privacy trigger. The privacy trigger may be related to a relay ID, a specific per-hop link, or a specific E2E unicast link. WTRU1 may generate a per-hop ID (e.g., a new per-hop ID). For E2E links (e.g., all E2E links) going through the specific relay, WTRU1 may generate an E2E ID (e.g., new E2E ID) and a portion (e.g., a new portion) of the security IDs/session key identifiers. For the security IDs/session key identifiers, WTRU1 may generate MSBs (e.g., a new MSBs) or LSBs (e.g., new LSBs) of the Knrp-sess ID, depending on if WTRU1 has previously generated the MSBs or LSBs. WTRU1 may send a LIU request message to the relay via the management link. WTRU1 may indicate that the request applies to a specific per-hop link. The source/destination IDs for the per-hop link may be specified in the LIU request message with the WTRU1 per-hop ID (e.g., the new WTRU1 per-hop ID). E2E specific information may be specified (e.g., may also be specified) in the LIU request message. The E2E specific information may include one or more of the following: the current source/destination E2E IDs, the WTRU1 E2E ID (e.g., new WTRU E2E ID), and the WTRU1 security IDs/session key identifiers portion (e.g., new MSBs of Knrp-sess ID). WTRU1 may include (e.g., may also include) a number to identify this message. The number may be a sequence number or a random number, for example.

If WTRU1 has established multiple E2E links via this relay (e.g., transported via the same per-hop link), these E2E IDs (e.g., all these E2E IDs) may be changed (e.g., may also be changed). Multiple E2E specific information may be included on the message.

The number of E2E links included in the message may be specified. An indication about subsequent request messages to be sent may be specified (e.g., more indication).

At 2, the relay may receive the message, fetch the specific per-hop link and E2E links information, and update its mapping table with the WTRU1 IDs (e.g., the new WTRU1 IDs), for example, while keeping the current values. The relay may generate IDs (e.g., new IDs) to change its per-hop ID and the E2E relay-specific IDs/session key identifiers mapping to peer WTRUs (e.g., mapping to WTRU2). The relay may send back the LIU response message. The LIU response message may include its ID (e.g., new ID) for the per-hop link, its relay-specific E2E ID (e.g., new relay-specific E2E ID), and a portion (e.g., new portion) of the security IDs/session key identifiers, such as MSBs or LSBs of Knrp-sess ID (e.g., new MSBs or LSBs of Knrp-sess ID). The number, as received on the request message, may be repeated on the response message.

If multiple E2E IDs were specified in the request message, the relay may include the corresponding E2E IDs (e.g., same corresponding E2E IDs) in the response message.

If a "more" indication was specified on the request message, the relay may expect to receive another LIU request message.

At 3, if WTRU1 changes its IDs related to multiple E2E links, the list of E2E IDs may be sent via multiple request messages (e.g., one E2E link IDs per request message or multiple per request message, with a maximum number per request message). A number (e.g., new number) may be used if sending this message. WTRU1 per-hop link ID may have been changed at 1 and may not be included in this subsequent request message.

At 4, if the relay receives a subsequent request message, it may behave as described in 2. The number as received on the request at 3 may be used on the response message. WTRU2 per-hop link ID may have been changed at 2 and may not be included in this subsequent request message.

At 5, WTRU1 may validate that the received number matches the number that it has previously sent. WTRU1 may update its table with the IDs (e.g., new IDs) received. WTRU1 may validate (e.g., may also validate) that an LIU response message has been received for LIU request messages (e.g., all LIU request messages) sent. WTRU1 may send an LIU Ack message including the per-hop link IDs and the last number sent/received on the request/response messages, for example, in this case, if a sequence number was used. The list of numbers may (e.g., may instead) be specified (e.g., if a random number was used). The list of E2E link IDs that were updated may (e.g., may also) be specified (e.g., may be included in the transmitted messages, added as parameters to the LIU Ack message, etc.) and their corresponding new values may (e.g., may also) be specified (e.g., may be included in the transmitted messages, added as parameters to the LIU Ack message, etc.).

Application layer and IP address/prefix changes may be performed. Isolating the IDs (e.g., per-hop IDs, E2E IDs, E2E security IDs/session key identifiers) on a per-hop basis may limit the change of these IDs between the WTRU and the relay. The application layer ID and IP address/prefix, if IP communication is used, may need to be changed (e.g., periodically).

To support the change of application layer ID and IP address/prefix, the link modification procedure may be modified to allow sending the source WTRU application layer ID (e.g., new application layer ID) and IP address/prefix (e.g., new IP address/prefix), if IP communication is used, to the concerned E2E peer WTRUs. The link modification procedure may be run with the E2E peer WTRUs aware of this application layer ID, and possibly IP address/prefix.

Using the isolation of IDs (e.g., as described herein) may be used to limit the change of application layer ID and IP address/prefix to the source WTRU (e.g., the E2E peer WTRU may not need to change its application layer ID and IP address/prefix). For example, a reason to limit this change to the source WTRU may be that the change of IDs on both WTRUs, (e.g., at the same time), may have been required because of a linkability issue (e.g., which may not apply in this case).

The linkability issue may arise, for example, if the source WTRU IDs that are sent in cleartext are changed while the peer WTRU IDs, sent (e.g., also sent) in cleartext, are not changed. Since these IDs may be visible and if the source WTRU IDs (e.g., only the source WTRU IDs) are changed, a malicious WTRU may link the source WTRU IDs (e.g., source WTRU new IDs) with the old source WTRU IDs by referring to the peer WTRU IDs that have not changed. Both WTRUs may change their IDs at the same time to avoid this linkability issue.

The IDs sent in cleartext may be changed (e.g., may all be changed) between the WTRU and the relay using the per-hop isolation of IDs (e.g., in this case). The application layer ID and IP address/prefix may not be sent in cleartext and no linkability issue may be observed if the source WTRU changes them (e.g., if only the source WTRU changes them).

If the application layer ID and possibly IP address/prefix are changed on a source WTRU, this WTRU (e.g., the source WTRU) may find per-hop links (e.g., all per-hop links) with which these IDs have been used. The LIU procedure may be run for these links (e.g., all these links). The concerned peers may be informed of the IDs (e.g., new IDs), for example, using the link modification procedure.

Figure 5:
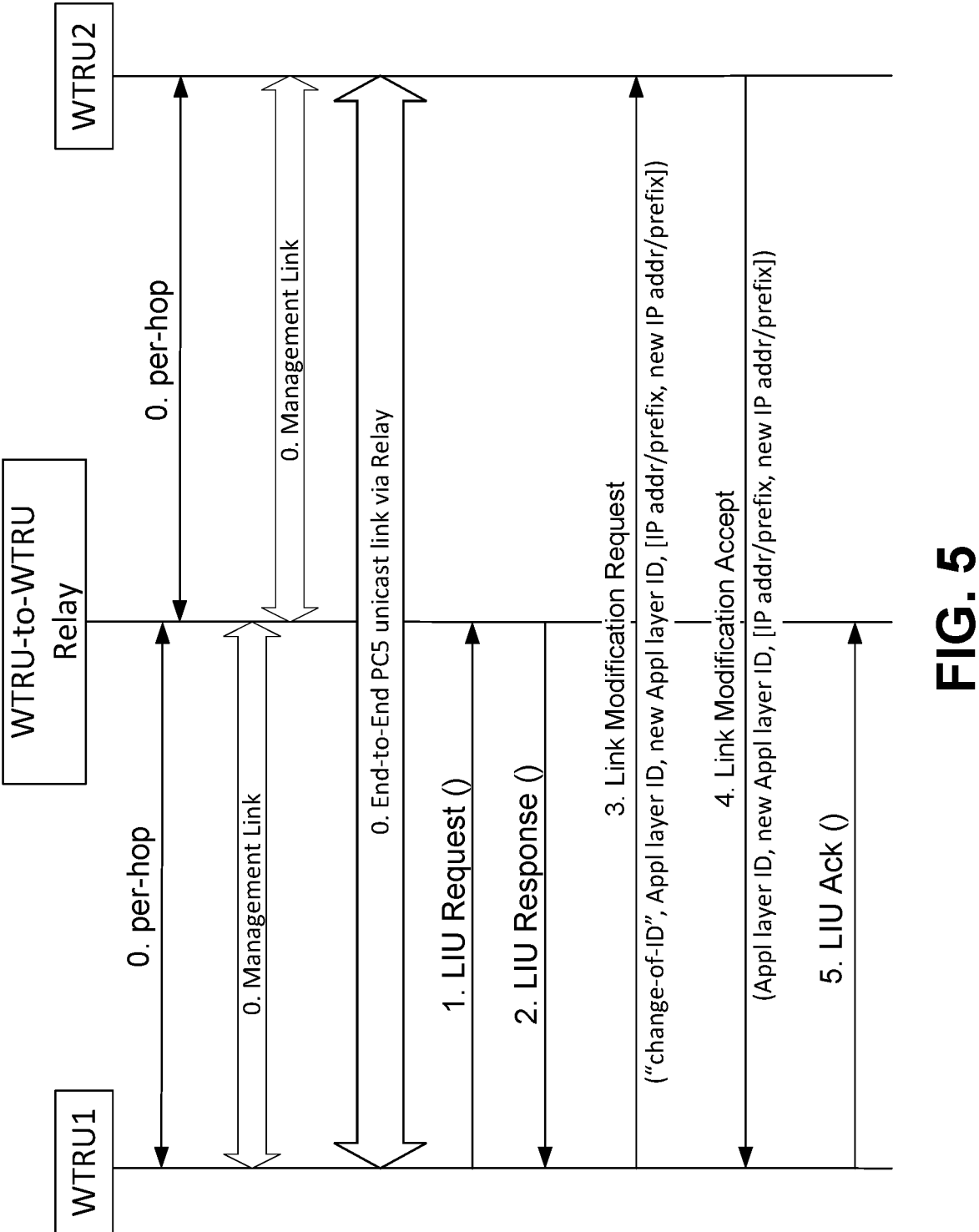
FIG. 5 illustrates an example procedure if the application layer ID and Internet Protocol (IP) address/prefix are changed on the source WTRU.

FIG. 5 illustrates an example procedure if the application layer ID and IP address/prefix are changed on the source WTRU. FIG. 5 may illustrate support of application layer ID and IP address/prefix change related to PC5 unicast links, for example, established via WTRU-to-WTRU relay. One or more of the actions illustrated may be performed.

At 0, WTRU1 may have a per-hop link with the relay (e.g., relay WTRU) and may have an E2E PC5 unicast link established with WTRU2. WTRU1 and WTRU2 may have (e.g., may also have) a management link established with the relay (e.g., relay WTRU). This management link may be a PC5 unicast link with security enabled (e.g., at least encryption).

At 1, WTRU1 may receive a trigger to change its application layer ID and IP address/prefix (e.g., it may receive a new application layer ID and a new IP address/prefix, if IP communication is used, from the application layer).

WTRU1 may send an LIU request message (e.g., a fourth message) to the relay (e.g., relay WTRU) indicating per-hop IDs (e.g., new per-hop IDs) and E2E link information. E2E link information may include E2E IDs and E2E security IDs (e.g., MSBs/LSBs of Knrp-sess ID) for E2E (e.g., all E2E) unicast links with this relay. The LIU message may indicate a request to update stored E2E link information associated with an E2E link and with MSBs/LSBs (e.g., a first set of MSBs and a first set of relay LSBs) of Knrp-sess ID (e.g., the session key identifier). The LIU message may indicate a second set of MSBs of Knrp-sess ID (e.g., new session key identifier) and a E2E ID (e.g., a new E2E ID) for WTRU1. The relay (e.g., the relay WTRU) may determine a second set of relay LSBs of Knrp-sess ID (e.g., a new session key identifier) and a relay E2E ID (e.g., a new relay E2E ID) for WTRU1.

At 2, the relay (e.g., the relay WTRU) may send the LIU response message (e.g., a fifth message) to WTRU1 with its IDs (e.g., new IDs) for the per-hop link and for the E2E links specified on the LIU request. The LIU response message may indicate the second set of relay LSBs of Knrp-sess ID and relay E2E ID for WTRU1.

At 3, WTRU1 may send a link modification request to WTRU2 with its application layer ID (e.g., new application layer ID) and IP address/prefix (e.g., new IP address/prefix), if IP communication is used. The link modification request message may be modified to support an operation code (e.g., new operation code) for e.g., 'change-of-ID' and the application layer ID (e.g., new application layer ID) and IP address/prefix (e.g., new IP address/prefix).

At 4, WTRU2 may send a link modification accept to Ack the IDs (e.g., new IDs) from WTRU1. The IDs (e.g., new IDs) received in the request message may be sent back with the accept message.

At 5, WTRU1 may send a LIU Ack message (e.g., a sixth message) to the relay (e.g., the relay WTRU) (e.g., this may complete the LIU procedure). The LIU Ack message may indicate that WTRU1 received the indication of the second set of relay LSB of Knrp-sess ID and relay E2E ID for WTRU1.

WTRU1 and relay (e.g., relay WTRU) may start using the per-hop L2 IDs (e.g., new per-hop L2 IDs), E2E IDs (e.g., new E2E IDs), and associated security IDs (e.g., new associated security IDs). WTRU1 and WTRU2 may start using WTRU1's application layer ID (e.g., new application layer ID) and IP address/prefix (e.g., new IP address/prefix).

Examples of a compatible direct/indirect link establishment request are provided herein.

A WTRU (e.g., WTRU1) may trigger the link establishment procedure if: WTRU1 wants to announce its supported service(s); and/or WTRU1 wants to establish a PC5 unicast link with a specific target WTRU. WTRU1 may allow direct and/or indirect (e.g., via a relay) communication for the advertised services. In examples, the WTRU1 may send a regular DCR message for direct communication (e.g., without an adaptation header, for example, not used at relays) to advertise its services. In examples, the WTRU1 may send an indirect DCR message (e.g., with adaptation layer) so that relays may forward the DCR message. The WTRU1 may not know if the target WTRU is reachable directly or via a relay and may allow both possibilities. In examples, the WTRU1 may send (e.g., first send) a DCR message (e.g., a regular DCR message) for direct communication. In examples, if no response is received from the target WTRU, the WTRU1 may send a DCR message (e.g., another DCR message, including adaptation layer) that may be forwarded by relays.

In examples where the direct/indirect procedures use a different DCR message format, a two part procedure may be used. WTRU1 may send DCR messages (e.g., two DCR messages) advertising the same information. The difference (e.g., the only difference) between the DCR messages (e.g., two DCR messages) may be that one message includes an adaptation header and the other one does not. Having this two part procedure may generate more PC5 signaling from WTRU1 and may delay the link establishment via the relay when the target WTRU may be reachable (e.g., may only be reachable) via a relay.

Examples of minimizing and/or limiting PC5 signaling during link establishment when both direct/indirect communication may be allowed are provided herein. Examples of making link establishment via a relay with a known target WTRU more efficient are provided herein.

In examples with direct communication, a PC5 unicast link may be identified (e.g., uniquely identified) using the pair of source WTRU L2 ID and target WTRU L2 ID. In examples with indirect communication (e.g., via a relay and using an adaptation header), if a WTRU receives a message from the relay, the adaptation header may include the E2E peer WTRU ID (e.g., the E2E peer WTRU ID only, not the WTRU's E2E ID).

Using the pair of L2 IDs with direct communication may provide the ability to locate (e.g., uniquely locate) a unicast link even in the case where two peer WTRUs use the same L2 ID. In examples, the WTRU may not know to which E2E PC5 link the message is associated if the peer WTRU's E2E ID (e.g., if only the peer WTRU's E2E ID) is included in the adaptation header.

In examples, WTRU1 may send a DCR message without an adaptation header. A relay may receive the DCR message and may add an adaptation header to the DCR message before forwarding it. A first target WTRU may receive the DCR message directly from WTRU1 and may establish a direct unicast link with WTRU1. A second target WTRU may receive the DCR message via the relay and may establish an indirect unicast link with WTRU1. A WTRU may use the E2E security context ID (e.g., Knrp-sess ID) to identify (e.g., uniquely identify) the E2E link when receiving a PC5 message, for example, which may include information (e.g., may only include information) identifying the peer WTRU.

Figure 6:
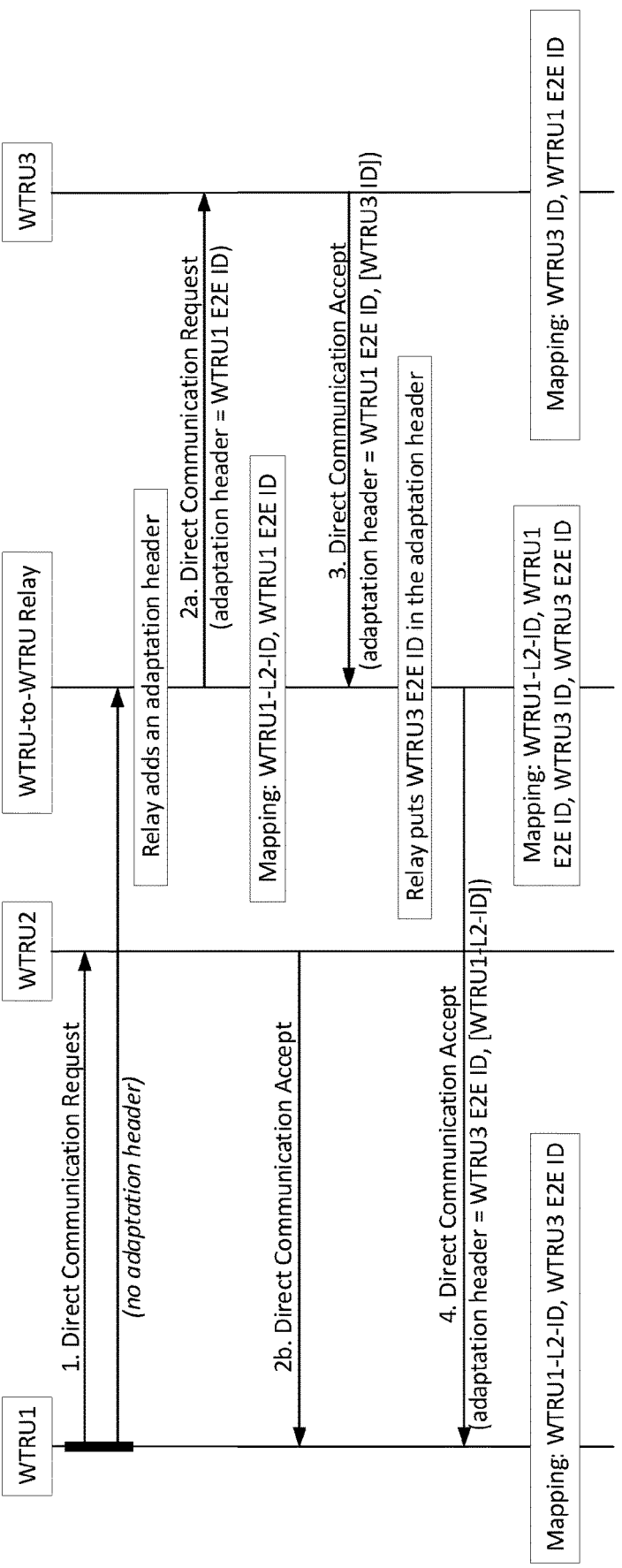
FIG. 6 illustrates an example compatible direct/indirect PC5 unicast link establishment procedure.

FIG. 6 illustrates an example compatible direct/indirect PC5 unicast link establishment procedure. To make the link establishment procedure more efficient and to reduce the PC5 signaling, a single part procedure may be used. For example, a DCR message (e.g., a single DCR message) may be used for direct and indirect link establishment procedures. To enable a single part procedure for direct and indirect link establishment procedure with integrated discovery, an initiating WTRU (e.g., WTRU1) may send a DCR message without an adaptation header. A second WTRU (e.g., WTRU2) may receive the DCR message and establish a direct unicast link with the initiating WTRU. A relay WTRU may receive the DCR message, without an adaptation header, and may add an adaptation header to the DCR message before forwarding it. A third WTRU (e.g., WTRU3) may receive the DCR message via the relay and may establish an indirect unicast link with the initiating WTRU.

A WTRU (e.g., WTRU1) may receive a message with an adaptation header, which may include (e.g., may only include) information identifying the peer WTRU ID (e.g., WTRU3 E2E ID) (e.g., may not include WTRU1 E2E ID) and may use the E2E security context ID (e.g., Knrp-sess ID) to identify (e.g., uniquely identify) the E2E link. In examples, the security context ID may be passed to the ProSe layer if a PC5 message is received. Receiving the peer WTRU E2E ID (e.g., only the peer WTRU E2E ID) may not be enough for WTRU1 to identify (e.g., uniquely identify) the E2E link, for example, in the case where the same E2E ID may be used for WTRU3 and 4.

In examples, the WTRU1 may send a DCR message without an adaptation header. The WTRU1 may specify its layer-2 ID (WTRU1 L2 ID) in the message header.

In examples, the relay may receive the DCR message and may add an adaptation header before forwarding the message. The relay may generate a relay-specific E2E ID (e.g., relay-specific ID1) as WTRU1 E2E ID and may keep the mapping with WTRU1 L2 ID as received on the DCR message. The relay may (e.g., may also) generate relay-specific MSBs of Knrp-sess ID and may keep the mapping with the MSBs of Knrp-sess ID provided by WTRU1 in the message payload. The relay-specific ID1 and relay-specific MSBs of Knrp-sess ID may be put in the adaptation header (e.g., as specified in FIG. 3 at 2). In examples, the relay may use WTRU1 L2 ID received on the DCR message as WTRU1 E2E ID and may put it in the adaptation header instead of the relay-specific ID. In examples, the MSBs of Knrp-sess ID provided by WTRU1 may be put in the adaptation header. For the remainder of the procedure, the MSBs and LSBs of Knrp-sess ID may be treated as specified in FIG. 3, for example. In examples, the WTRU2 may receive the DCR message (e.g., directly) from WTRU1 (e.g., receive the DCR message without an adaptation header) and may continue the PC5 unicast link establishment procedure with WTRU1 directly, without adding an adaptation header. The WTRU2 may send a direct communication accept message (e.g., without including an adaptation header). The authentication and/or security procedures may be executed between WTRU1 and WTRU2, if needed, before sending the DCA message (not shown in FIG. 6).

In examples, the WTRU3 may receive the DCR message from the relay, which may include an adaptation header. The WTRU3 may continue the PC5 unicast link establishment procedure with WTRU1 indirectly, for example, via the relay. An adaptation header may be specified with the PC5 messages exchanged between WTRU3 and WTRU1 via the relay. If WTRU3 sends a message via the relay, the adaptation header may include the destination ID (e.g., WTRU1 E2E ID) that the WTRU3 has received on the DCR message. The adaptation header may include WTRU3's ID associated to the E2E link, for example, WTRU3 ID (generated by WTRU3). The WTRU3 may send a DCA message for WTRU1 via the relay, for example, including an adaptation header.

In examples, if receiving a message for WTRU1, the relay may remove the destination ID from the adaptation header or replace the destination ID (e.g., WTRU1 E2E ID) with WTRU1 L2 ID in the adaptation header as specified with the DCR message. The relay may save the WTRU1 L2 ID into the relay's mapping table before forwarding the DCR message with WTRU1's E2E ID. The relay may add WTRU3 E2E ID as the source ID in the adaptation header before forwarding the message to WTRU1. The relay may generate a relay-specific ID for WTRU3 (e.g., relay-specific ID3) to be used as WTRU3 E2E ID. In examples, the relay may use WTRU3 L2 ID as WTRU3 E2E ID. The relay may keep the mapping of WTRU3 information (e.g., WTRU3 L2 ID and WTRU3 E2E ID).

In examples, the WTRU1 may support receiving replies for direct or indirect communication (e.g., responses directly from the WTRU2 or from the WTRU3 via the relay). If a response is directly received from a target WTRU (e.g., WTRU2), the WTRU1 may continue the direct link establishment procedure with the target WTRU (e.g., normal PC5 link establishment behavior). In examples, the PC5 messages may not include an adaptation layer. If a response from a target WTRU (e.g., WTRU3) is received via a relay (e.g., including an adaptation header), the WTRU1 may continue the indirect link establishment procedure and communication via this relay. In examples, WTRU1 may receive/send messages which may include an adaptation header. The target WTRU E2E ID (e.g., as received in the adaptation header from the relay, for example, WTRU3 E2E ID) may be specified in the adaptation header if the WTRU1 receives a message via the relay. The WTRU1 may save the mapping between its L2 ID (e.g., source L2 ID used on the DCR message and possibly WTRU1 ID (e.g., generated by WTRU1) which may be used as source E2E ID in the adaptation header if WTRU1 sends a message via the relay) and the target WTRU's info (e.g., WTRU3 E2E ID received in the adaptation header and application layer ID) for this E2E link.

Examples of standalone direct/indirect discovery may be provided herein. In examples when a WTRU communicates with a peer WTRU via a relay, the relay may be able to forward messages between E2E peer WTRUs based on the adaptation layer header content. In examples, the usage of an adaptation layer may be decided by the WTRUs and relay during the indirect link establishment procedure. In examples when a standalone discovery procedure is performed before the indirect link establishment procedure and if the adaptation layer is still decided during the indirect link establishment procedure, the procedure (e.g., the whole procedure) may become inefficient. In examples, broadcast messages may be provided even if WTRU1 has discovered WTRU3 during the discovery procedure. WTRU1 may not specify the discovered WTRU3 E2E ID with the DCR message since no adaptation may be used with the DCR message.

In examples provided herein, the WTRUs/relay may decide during the discovery phase if an adaptation layer header may be used. The WTRUs and relay may use an adaptation layer header decided during the discovery phase for indirect link establishment, which may simplify the indirect link establishment procedure and avoid unnecessary broadcast messages (e.g., the relay may forward a direct communication request to a peer WTRU (e.g., WTRU3) based on adaptation layer, instead of broadcasting it).

Examples during discovery phase may be provided herein. In examples, the ProSe WTRU-to-WTRU relay may receive an announcement message from a target WTRU that may announce its supported application ID. If receiving the announcement message, the relay may assign an E2E ID for the target WTRU (e.g., a relay specific ID or may re-use the target WTRU L2 ID as received with the announcement message) and may broadcast the announcement message with the assigned E2E ID. The assigned E2E ID may be included in the announcement message or in an adaptation layer header.

In examples, the ProSe WTRU-to-WTRU relay may receive a solicitation message from a source WTRU. The solicitation message may include a specific target WTRU ID or an application ID to search for WTRUs (e.g., all WTRUs) running that application. If receiving the solicitation message, the relay may assign an E2E ID for the source WTRU (e.g., a relay specific ID or may re-use the source WTRU L2 ID as received with the solicitation message) and may broadcast the solicitation message with the assigned source WTRU E2E ID. The assigned source WTRU E2E ID may be included in the solicitation message or in an adaptation layer header. If receiving the solicitation message, a target WTRU (e.g., interested in the announced application ID or recognizing its specified target WTRU ID) may respond with a response message and may specify the source WTRU E2E ID received with the solicitation message.

In examples, the relay may receive the response message from the target WTRU. The relay may assign an E2E ID for the target WTRU (e.g., a relay specific ID or may re-use the target WTRU L2 ID). If the solicitation message received by the target WTRU included an adaptation header, the response message may have an adaptation header including the source WTRU E2E ID. If the solicitation message received by the target included no adaptation header, the source WTRU E2E ID may be specified in the response message. The relay may forward the response message to WTRU1 with the assigned target WTRU E2E ID specified either in the adaptation header or into the response message.

In examples when the source and target WTRUs are successfully discovered, the source and target WTRUs may set up a unicast link via the relay using the DCR message (e.g., adding the adaptation layer). The target WTRU E2E ID may already be discovered so WTRU1 may send the DCR message with an adaptation header including the target WTRU E2E ID. The DCR message may be sent to the selected relay.

Examples of a standalone discovery-based procedure may be provided with the assumption that the peer WTRUs may communicate via relay. The relay may be able to forward messages between peer WTRUs based on the adaptation layer header. The WTRU (e.g., target or source) may receive the discovery message from (e.g., directly from) the announcing WTRU or via a relay. In examples, the WTRU may decide to provide direct link establishment or establishment via the relay (e.g., indirect link establishment). The decision may be based on policies or link quality, for example.

Figure 7:
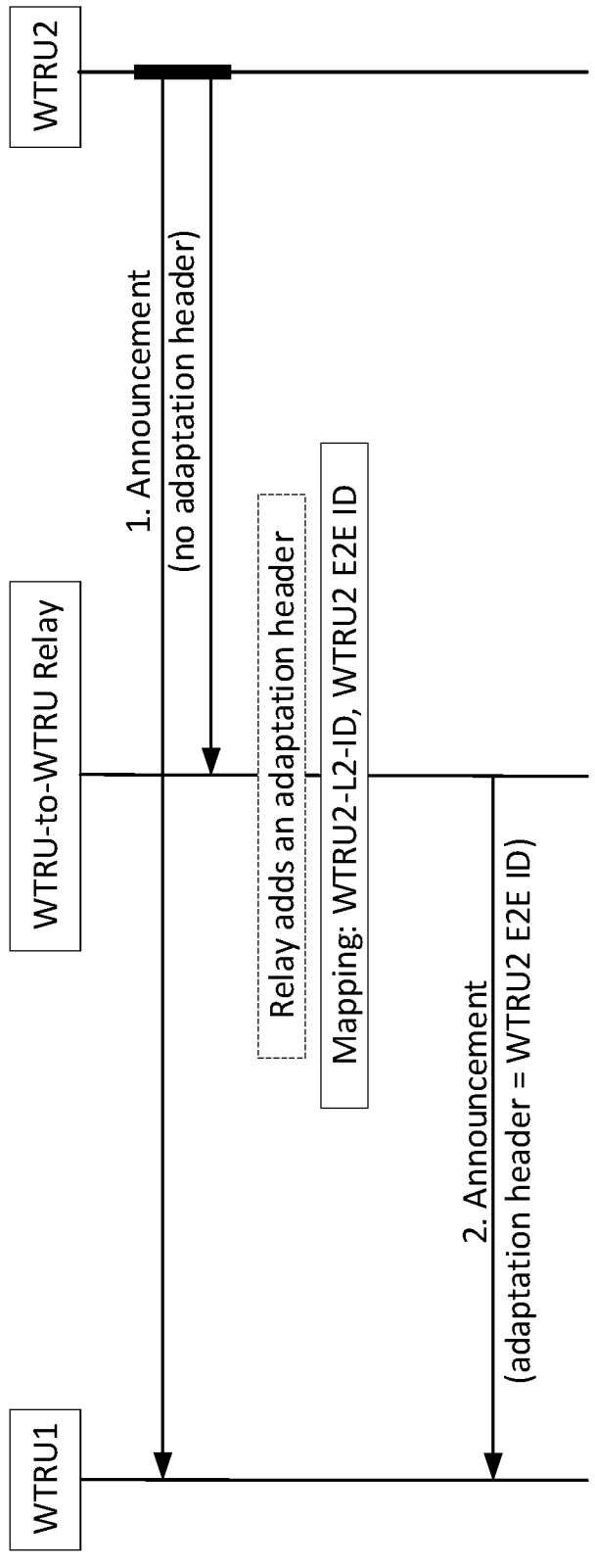
FIG. 7 illustrates an example of a discovery procedure when an adaptation header is included.

Examples based on WTRU-to-WTRU discovery are provided herein. FIG. 7 illustrates an example of a discovery procedure if an adaptation header is included. As shown in FIG. 7, the relay WTRU may add an adaptation header to the announcement message before forwarding it. The target WTRU (e.g., WTRU2) may send an announcement message that may include a supported application ID, for example. WTRU2 may (e.g., may also) include an indication (e.g., relay allowed), indicating if relays may forward the message. The relay may receive the announcement message from WTRU2. The relay may allocate an E2E ID for WTRU2 (e.g., may generate a relay-specific ID or may re-use WTRU2 L2 ID as WTRU2 E2E ID) and may keep the mapping with WTRU2 L2 ID as received with the announcement message from WTRU2. The relay may forward the announcement message with information (e.g., additional information) including the relay ID and WTRU2 E2E ID.

In examples, before forwarding the announcement message, the adaptation header may not be added, and the announcement message may be sent with information (e.g., additional information) in the message. In examples, before forwarding the announcement message, the adaptation header including WTRU2 E2E ID may be added. The relay ID may be added to the adaptation header or to the message.

WTRU1 may initiate the link establishment procedure when receiving the announcement message from WTRU2 via the relay. WTRU1 may send a DCR message via the relay with an adaptation header including WTRU2 E2E ID as received on the announcement message.

The relay may add WTRU1 E2E ID in the adaptation header and may replace WTRU2 E2E ID with WTRU2 ID, based on the information from its mapping table. The relay may forward the DCR message to target WTRU2. A difference with these examples is that in other examples, the DCR message sent by WTRU1 may already include an adaptation header so the relay may modify the information in the adaptation header and may not need to add it. In examples, WTRU2 may complete the link establishment by sending a DCA message which may be forwarded to WTRU1 by the relay.

Figure 8:
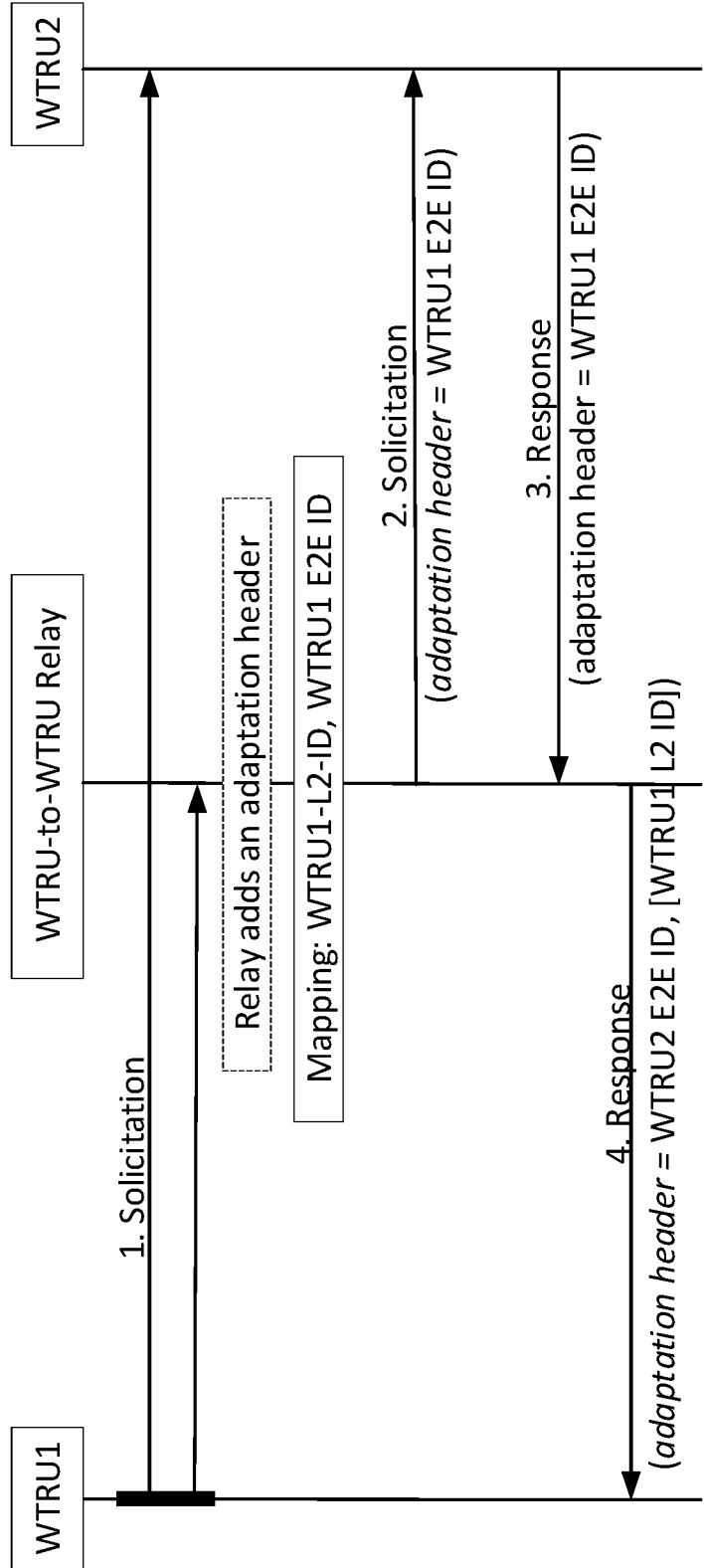
FIG. 8 illustrates another example of a discovery procedure when an adaptation header is included.

FIG. 8 illustrates an example of a discovery procedure when an adaptation header is included. As shown in FIG. 8, the target WTRU2 may receive a solicitation message from source WTRU1 via the relay WTRU, where the relay WTRU may add an adaptation header to the solicitation message before forwarding it. WTRU1 may send a solicitation message that may include WTRU2 E2E ID and an application ID for an intended service (e.g., any intended service). The WTRU1 may (e.g., may also) include an indication if relaying is allowed.

The relay, if receiving the solicitation message, may allocate an E2E ID for WTRU1 (e.g. may generate a relay-specific ID or may re-use WTRU1 L2 ID as WTRU1 E2E ID) and may keep the mapping with WTRU1 L2 ID as received with the solicitation message from WTRU1. The relay may broadcast the solicitation message and may act according to one of the following: an adaptation header may not be added for the solicitation message and the solicitation message may be sent with additional information that may include WTRU1 E2E ID and relay L2 ID; or an adaptation header including WTRU1 E2E ID may be added before forwarding the solicitation message.

If the solicitation message received via the relay does not include an adaptation header, then WTRU2 may send a response message including WTRU1 E2E ID. If the solicitation message received via the relay includes an adaptation header, then WTRU2 may send a response message and may add an adaptation header where WTRU1 E2E ID is included.

The relay may generate an E2E ID for WTRU2 and may keep the mapping with WTRU2 L2 ID or may use WTRU2 L2 ID as received on the response message as WTRU2 E2E ID. The relay WTRU may forward the response message to WTRU1. If the solicitation message received via the relay does not include an adaptation header, the relay may include WTRU2 E2E ID in the response message. If the solicitation message received via the relay includes an adaptation header, the relay may put WTRU2 E2E ID in the adaptation header. The relay may replace WTRU1 E2E ID as received by WTRU2 with WTRU1 L2 ID from its mapping table.

In examples, if the discovery procedure is completed, the link establishment procedure may be triggered (e.g., WTRU1 may send a DCR message including WTRU2 E2E ID in the adaptation header and WTRU2 may respond with a DCA message including WTRU1 E2E ID in the adaptation header).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A relay wireless transmit/receive unit (WTRU) for establishing an end-to-end (E2E) link, comprising:
   a processor configured to:
      receive a first message from a first WTRU, wherein the first message comprises an adaptation header that indicates a first set of most significant bits (MSBs) for the first WTRU that are associated with a first session key identifier;
      generate a second session key identifier;
      generate a second set of MSBs based on the second session key identifier, wherein the second set of MSBs have a mapping to the first set of MSBs;
      send a second message to a second WTRU, wherein the second message indicates the second set of MSBs;
      generate a first set of least significant bits (LSBs) based on the second session key identifier, wherein the first set of LSBs have a mapping to a second set of LSBs that are associated with the second WTRU; and
      send a third message to the first WTRU, wherein the third message indicates the first set of LSBs.

2. The relay WTRU of claim 1, wherein the processor is further configured to:
   receive a fourth message from the first WTRU, wherein the fourth message comprises a first data, the first set of LSBs, and the first set of MSBs for the first WTRU.

3. The relay WTRU of claim 2, wherein the processor is further configured to:
   generate a fifth message to the second WTRU based on the first set of LSBs and the first set of MSBs, wherein the fifth message comprises the first data, the second set of MSBs, and the second set of LSBs; and
   send the fifth message to the second WTRU.

4. The relay WTRU of claim 2, wherein the processor is further configured to:
   receive a sixth message from the second WTRU, wherein the sixth message comprises a second data, the second set of MSBs, and the second set of LSBs for the second WTRU.

5. The relay WTRU of claim 4, wherein the processor is further configured to:
   generate a seventh message to the first WTRU based on the second set of MSBs and the second set of LSBs, wherein the seventh message comprises the second data, the first set of LSBs, and the first set of MSBs; and
   send the seventh message to the first WTRU.

6. The relay WTRU of claim 1, wherein the processor is further configured to:
   receive a fourth message from the first WTRU, wherein the fourth message indicates E2E link information including the first session key identifier, indicates a request to update E2E link information associated with the E2E link and with the first session key identifier, and indicates a third set of MSBs for the first WTRU.

7. The relay WTRU of claim 6, wherein the processor is further configured to:
   determine a third set of LSBs, wherein the third set of LSBs and the third set of MSBs for the first WTRU are associated with the first session key identifier; and
   send a fifth message to the first WTRU, wherein the fifth message indicates the third set of LSBs.

8. The relay WTRU of claim 7, wherein the processor is further configured to:
   receive a sixth message from the first WTRU, wherein the sixth message indicates that the first WTRU received the indication of the third set of LSBs.

9. The relay WTRU of claim 1, wherein the first session key identifier and the second session key identifier are associated with a same session.

10. The relay WTRU of claim 1, wherein the adaptation header comprises the second message and the third message.

11. A method for establishing an end-to-end (E2E) link, comprising:

receiving a first message from a first WTRU, wherein the first message comprises an adaptation header that indicates a first set of most significant bits (MSBs) for the first WTRU that are associated with a first session key identifier;

generating a second session key identifier;

generating a second set of MSBs based on the second session key identifier, wherein the second set of MSBs have a mapping to the first set of MSBs;

sending a second message to a second WTRU, wherein the second message indicates the second set of MSBs;

generating a first set of least significant bits (LSBs) based on the second session key identifier, wherein the first set of LSBs have a mapping to a second set of LSBs that are associated with the second WTRU; and sending a third message to the first WTRU, wherein the third message indicates the first set of LSBs.

12. The method of claim 11, further comprising:

receiving a fourth message from the first WTRU, wherein the fourth message comprises a first data, the first set of LSBs, and the first set of MSBs for the first WTRU.

13. The method of claim 12, further comprising:

generating a fifth message to the second WTRU based on the first set of LSBs and the first set of MSBs, wherein the fifth message comprises the first data, the second set of MSBs, and the second set of LSBs; and sending the fifth message to the second WTRU.

14. The method of claim 13, further comprising:

receiving a sixth message from the second WTRU, wherein the sixth message comprises a second data, the second set of MSBs, and the second set of LSBs for the second WTRU.

15. The method of claim 14, further comprising:

generating a seventh message to the first WTRU based on the second set of MSBs and the second set of LSBs, wherein the seventh message comprises the second data, the first set of LSBs, and the first set of MSBs; and sending the seventh message to the first WTRU.

16. The method of claim 11, further comprising:

receiving a fourth message from the first WTRU, wherein the fourth message indicates E2E link information including the first session key identifier, indicates a request to update E2E link information associated with the E2E link and with the first session key identifier, and indicates a third set of MSBs for the first WTRU.

17. The method of claim 16, further comprising:

determining a third set of LSBs, wherein the third set of LSBs and the third set of MSBs for the first WTRU are associated with the first session key identifier; and sending a fifth message to the first WTRU, wherein the fifth message indicates the third set of LSBs.

18. The method of claim 17, further comprising:

receiving a sixth message from the first WTRU, wherein the sixth message indicates that the first WTRU received the indication of the third set of LSBs.

19. The method of claim 11, wherein the first session key identifier and the second session key identifier are associated with a same session.

20. The method of claim 11, wherein the adaptation header comprises the second message and the third message.

* * * * *